US012120029B2

(12) United States Patent
Xiong

(10) Patent No.: US 12,120,029 B2
(45) Date of Patent: Oct. 15, 2024

(54) METHOD FOR IMPLEMENTING SERVICE CONTINUITY AND RELATED DEVICE

(71) Applicant: Tencent Technology (Shenzhen) Company Limited, Guangdong (CN)

(72) Inventor: Chunshan Xiong, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 448 days.

(21) Appl. No.: 17/708,686

(22) Filed: Mar. 30, 2022

(65) Prior Publication Data

US 2022/0224646 A1 Jul. 14, 2022

Related U.S. Application Data

(63) Continuation of application No. PCT/CN2021/079715, filed on Mar. 9, 2021.

(30) Foreign Application Priority Data

Apr. 30, 2020 (CN) .......................... 202010367304.7

(51) Int. Cl.
*H04L 45/745* (2022.01)
*H04L 45/02* (2022.01)
*H04W 36/14* (2009.01)

(52) U.S. Cl.
CPC ............ *H04L 45/745* (2013.01); *H04L 45/02* (2013.01); *H04W 36/142* (2023.05)

(58) Field of Classification Search
CPC .................. H04L 45/745; H04L 45/02
See application file for complete search history.

(56) References Cited

U.S. PATENT DOCUMENTS

| 2020/0092423 | A1* | 3/2020 | Qiao | ...................... H04W 80/10 |
| 2020/0359293 | A1* | 11/2020 | Li | ........................ H04W 12/06 |
| 2023/0007556 | A1* | 1/2023 | Qiao | ...................... H04W 36/08 |

FOREIGN PATENT DOCUMENTS

| CN | 109981316 A | 7/2019 |
| CN | 110169089 A | 8/2019 |

(Continued)

OTHER PUBLICATIONS

Tencent, "KI #2, New Sol: Edge Server Relocation", SA WG2 Meeting #139E, S2-2004186, Jun. 2020, pp. 1-4.

(Continued)

*Primary Examiner* — Joseph E Avellino
*Assistant Examiner* — Maryam Emadi
(74) *Attorney, Agent, or Firm* — Sughrue Mion, PLLC

(57) ABSTRACT

A method for implementing service continuity, performed by a session management (SM) function (SMF) network element may include receiving a target relocation message, the target relocation message carrying target traffic routing information, the target traffic routing information comprising a target data network (DN) access identifier (DNAI) and network address translation (NAT) information, the NAT information comprising a target user equipment (UE) network address, a first application server (AS) network address, and a second AS network address, wherein a target UE corresponding to the target UE network address has established a target protocol data unit (PDU) session to a first PDU session anchor (PSA) user plane function (UPF) network element and is configured to communicate with a first AS corresponding to the first AS network address.

20 Claims, 17 Drawing Sheets

(56) References Cited

FOREIGN PATENT DOCUMENTS

CN 111586670 A 8/2020
WO WO-2019149177 A1 * 8/2019 ......... H04L 47/2441

OTHER PUBLICATIONS

International Search Report of PCT/CN2021/079715 dated May 31, 2021 [PCT/ISA/210].
Written Opinion of PCT/CN2021/079715 dated May 31, 2021 [PCT/ISA/237].
Extended European Search Report issued Nov. 4, 2022 in European Application No. 21797348.6.
Intel, "Solution for KI#2: Network based IP address replacement for traffic subject to edge computing", SA WG2 Meeting #136AH, S2-2000216, Jan. 13-17, 2020, Incheon, South Korea (7 pages total).
3rd Generation Partnership Project; Technical Specification Group Services and System Aspects; "Study on enhancement of support for Edge Computing in 5G Core network (5GC)" (Release 17), 3GPP TR 23.748, Jan. 2020, V0.3.0 (40 pages total).
Translation of the Written Opinion dated May 31, 2021 in Application No. PCT/CN2021/079715.

\* cited by examiner

METHOD FOR IMPLEMENTING SERVICE CONTINUITY AND RELATED DEVICE

CROSS-REFERENCE TO RELATED APPLICATION(S)

This application is a continuation application of International Application No. PCT/CN2021/079715, filed on Mar. 9, 2021, which claims priority to Chinese Patent Application No. 202010367304.7, filed with the China National Intellectual Property Administration on Apr. 30, 2020, the entire contents of which are incorporated by reference herein.

FIELD

The disclosure relates generally to communication technologies, and specifically, to a method and apparatus for implementing service continuity, a user plane function (UPF) network element, a user equipment (UE), an electronic device, and a computer-readable storage medium.

BACKGROUND OF THE DISCLOSURE

Currently, a technical problem that needs to be resolved is when a user equipment (UE) is moved, how to migrate an application server (AS), to keep service continuity or when the AS is migrated while the UE is not moved, how to keep service continuity.

Therefore, a method and apparatus for implementing service continuity, an electronic device, and a computer-readable storage medium that are innovative are required.

SUMMARY

Provided are a method and apparatus for implementing service continuity, a user plane function (UPF) network element, a user equipment (UE), an electronic device, and a computer-readable storage medium, to keep service continuity when a UE or an application server (AS) is migrated.

Other characteristics and advantages of the present disclosure become apparent from the following detailed description, or may be learned in part through the practice of the present disclosure.

In accordance with an aspect of an example embodiment of the disclosure, a method for implementing service continuity, performed by a session management (SM) function (SMF) network element may include receiving a target relocation message, the target relocation message carrying target traffic routing information, the target traffic routing information including a target data network (DN) access identifier (DNAI) and network address translation (NAT) information, the NAT information including a target UE network address, a first AS network address, and a second AS network address, where a target UE corresponding to the target UE network address has established a target protocol data unit (PDU) session to a first PDU session anchor (PSA) UPF network element and is configured to communicate with a first AS corresponding to the first AS network address, generating a packet processing rule based on the target traffic routing information, the packet processing rule including an NAT rule, the NAT rule including, translating a target address of an uplink packet transmitted by the target UE from the first AS network address into the second AS network address and translating a source address of a received downlink packet whose target address is the target UE network address from the second AS network address into the first AS network address, and delivering the packet processing rule to a target network device, to cause the target network device to forward, based on the packet processing rule, the uplink packet transmitted by the target UE to a second AS corresponding to the second AS network address and the received downlink packet whose target address is the target UE network address and whose source address is the second AS network address to the target UE.

In accordance with an aspect of an example embodiment of the disclosure, an apparatus may include at least one memory configured to store computer program code, and at least one processor configured to access said computer program code and operate as instructed by said computer program code, said computer program code including first receiving code configured to cause the at least one processor to receive a target relocation message, the target relocation message carrying target traffic routing information, the target traffic routing information including a target DNAI and NAT information, the NAT information including a target UE network address, a first AS network address, and a second AS network address, where a target UE corresponding to the target UE network address has established a target PDU session to a first PSA UPF network element and is configured to communicate with a first AS corresponding to the first AS network address, first generating code configured to cause the at least one processor to generate a packet processing rule based on the target traffic routing information, the packet processing rule including an NAT rule, the NAT rule including translating a target address of an uplink packet transmitted by the target UE from the first AS network address into the second AS network address, and translating a source address of a received downlink packet whose target address is the target UE network address from the second AS network address into the first AS network address, and first delivering code configured to cause the at least one processor to deliver the packet processing rule to a target network device, to cause the target network device to forward, based on the packet processing rule, the uplink packet transmitted by the target UE to a second AS corresponding to the second AS network address and the received downlink packet whose target address is the target UE network address and whose source address is the second AS network address to the target UE.

In accordance with an aspect of an example embodiment of the disclosure, a—transitory computer-readable storage medium may store computer instructions that, when executed by at least one processor, cause the at least one processor to receive a target relocation message, the target relocation message carrying target traffic routing information, the target traffic routing information including a target DNAI and NAT information, the NAT information including a target UE network address, a first AS network address, and a second AS network address, wherein a target UE corresponding to the target UE network address has established a target PDU session to a first PSA UPF network element and is configured to communicate with a first AS corresponding to the first AS network address, generate a packet processing rule based on the target traffic routing information, the packet processing rule including an NAT rule, the NAT rule including translating a target address of an uplink packet transmitted by the target UE from the first AS network address into the second AS network address, and translating a source address of a received downlink packet whose target address is the target UE network address from the second AS network address into the first AS network address, and deliver the packet processing rule to a target network device, to cause the target network device to forward, based on the packet processing rule, the uplink packet transmitted by the target UE to a second AS corresponding to the second AS network address and the received downlink packet whose target address is the target UE network address and whose source address is the second AS network address to the target UE.

An embodiment of the present disclosure provides a method for implementing service continuity, performed by a UPF network element, the method including receiving, through a target UPF network element, a target N4 session request message transmitted by a SMF network element, the target N4 session request message including a packet processing rule, and the packet processing rule including an NAT rule, receiving an uplink packet through the target UPF network element, translating, in a case that the target UPF network element detects according to the packet processing rule that the uplink packet has a source address being a target UE network address and a target address being a first AS network address, the target address of the uplink packet into a second AS network address according to the NAT rule, and forwarding the uplink packet having the target address translated into the second AS network address to a second AS corresponding to the second AS network address through the target UPF network element.

An embodiment of the present disclosure provides an apparatus for implementing service continuity, including a relocation message receiving unit, configured to receive a target relocation message, the target relocation message carrying target traffic routing information, the target traffic routing information including a target DNAI and NAT information, the NAT information including a target UE network address, a first AS network address, and a second AS network address, a target UE corresponding to the target UE network address having established a target PDU session to a first PSA UPF network element and communicating with a first AS corresponding to the first AS network address, a processing rule generating unit, configured to generate a packet processing rule according to the target traffic routing information, the packet processing rule including an NAT rule, the NAT rule including translating a target address of an uplink packet transmitted by the target UE from the first AS network address into the second AS network address and translating a source address of a received downlink packet whose target address is the target UE network address from the second AS network address into the first AS network address, and a processing rule delivering unit, configured to deliver the packet processing rule to a target network device, to cause the target network device to forward, according to the packet processing rule, the uplink packet transmitted by the target UE to a second AS corresponding to the second AS network address and the received downlink packet whose target address is the target UE network address and whose source address is the second AS network address to the target UE.

An embodiment of the present disclosure provides a UPF network element, including a session request message receiving unit, configured to receive a target N4 session request message transmitted by a SMF network element, the target N4 session request message including a packet processing rule, and the packet processing rule including an NAT rule, an uplink packet receiving unit, configured to receive an uplink packet, an uplink packet detection and translation unit, configured to translate, in a case that the target UPF network element detects according to the packet processing rule that the uplink packet has a source address being a target UE network address and a target address being a first AS network address, the target address of the uplink packet into a second AS network address according to the NAT rule, and an uplink packet forwarding unit, configured to forward the uplink packet having the target address translated into the second AS network address to a second AS corresponding to the second AS network address through the target UPF network element.

An embodiment of the present disclosure provides a UE, including a unit session establishing unit, configured to establish a target PDU session to a first PSA UPF network element, an AS communication unit, configured to communicate with a first AS corresponding to a first AS network address, and an uplink packet transmitting unit, configured to transmit an uplink packet to a target network device, the uplink packet having a source address being a target network device network address and a target address being the first AS network address, to cause the target network device to process the uplink packet according to a packet processing rule, to translate the target address of the uplink packet into a second AS network address and forward the uplink packet having the target address translated into the second AS network address to a second AS corresponding to the second AS network address.

An embodiment of the present disclosure provides a computer-readable storage medium, storing a computer program, the program, when executed by a processor, implementing the method for implementing service continuity according to the foregoing embodiments.

An embodiment of the present disclosure provides an electronic device, including one or more processors, and a storage apparatus, configured to store one or more programs, the one or more programs, when executed by the one or more processors, causing the one or more processors to implement the method for implementing service continuity according to the foregoing embodiments.

It is to be understood that the above general descriptions and the following detailed descriptions are merely for exemplary and explanatory purposes, and cannot limit the present disclosure.

BRIEF DESCRIPTION OF THE DRAWINGS

To describe the technical solutions in embodiments of the disclosure more clearly, the following briefly describes the accompanying drawings required for describing the embodiments. Apparently, the accompanying drawings in the following description show merely some embodiments of the disclosure, and a person of ordinary skill in the art may still derive other accompanying drawings from these accompanying drawings without creative efforts.

DETAILED DESCRIPTION

Figure 1:
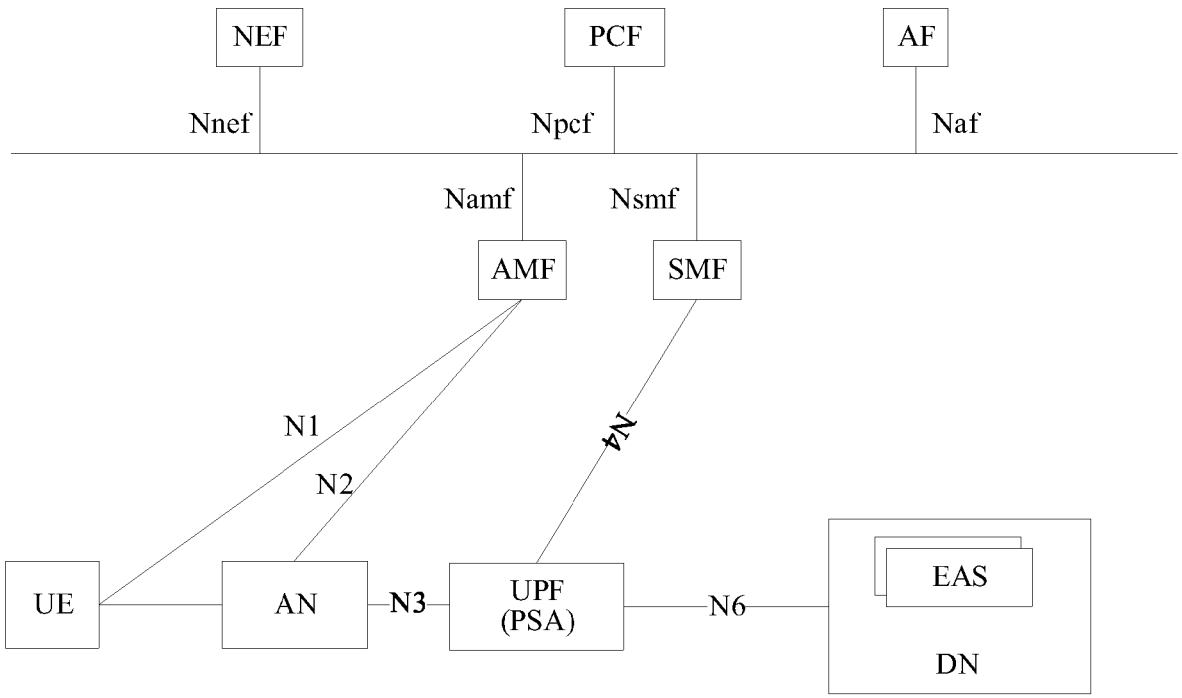
FIG. 1 is a schematic diagram of an edge computing (EC) architecture.

Exemplary implementations will now be described more thoroughly with reference to the accompanying drawings. However, the exemplary implementations may be implemented in various forms and are not to be construed as being limited to the examples set forth herein. Rather, the implementations are provided so that the present disclosure may be more comprehensive and complete, and the concepts of the exemplary implementations are fully conveyed to a person skilled in the art.

In addition, the described features, structures or characteristics may be combined in one or more embodiments in any appropriate manner. In the following descriptions, many specific details are provided to obtain a thorough understanding of the embodiments of the present disclosure. However, a person of skill in the art is to be aware that, the technical solutions in the present disclosure may be implemented without one or more of the particular details, or another method, element, material, apparatus, step, and the like may be used. In other cases, well-known methods, apparatuses, implementations, or operations are not shown or described in detail, in order not to obscure the aspects of the present disclosure.

The block diagrams shown in the accompanying drawings are merely functional entities and do not necessarily correspond to physically independent entities. That is, the functional entities may be implemented in a software form, or in one or more hardware modules or integrated circuits, or in different networks and/or processor apparatuses and/or microcontroller apparatuses.

The flowcharts shown in the accompanying drawings are merely exemplary descriptions, do not need to include all content and operations/steps, and do not need to be performed in the described orders either. For example, some operations/steps may be further divided, while some operations/steps may be combined or partially combined. Therefore, an actual execution order may change according to an actual case.

Particularly, according to the embodiments of the present disclosure, the processes described below with reference to the flowcharts may be implemented as computer software programs. For example, the embodiments of the present disclosure include a computer program product, including a computer program carried on a computer-readable storage medium. The computer program includes program code for performing the methods shown in the flowcharts.

The computer-readable storage medium shown in the present disclosure may be a computer-readable signal medium, a computer-readable storage medium, or any combination thereof. The computer-readable storage medium may be, for example, but is not limited to, an electric, magnetic, optical, electromagnetic, infrared, or semi-conductive system, apparatus, or component, or any combination of the above. A more specific example of the computer-readable storage medium may include, but is not limited to: an electrical connection with one or more wires, a portable computer disk, a hard disk, a random access memory (RAM), a read-only memory (ROM), an erasable programmable read-only memory (EPROM) (or a flash memory), an optical fiber, a portable compact disc ROM (CD-ROM), an optical storage device, a magnetic storage device, or any suitable combination thereof. In the present disclosure, the computer-readable storage medium may be any tangible medium including or storing a program, and the program may be used by or in combination with an instruction execution system, apparatus, or device. In the present disclosure, the computer-readable signal medium may be a data signal included in a baseband or propagated as a part of a carrier, in which computer-readable program code is carried. A data signal propagated in such a way may assume a plurality of forms, including, but not limited to, an electromagnetic signal, an optical signal, or any appropriate combination thereof. The computer-readable signal medium may alternatively be any computer-readable storage medium other than the computer-readable storage medium. The computer-readable storage medium may send, propagate, or transmit a program for use by or in combination with an instruction execution system, apparatus, or device. The program code included in the computer-readable storage medium may be transmitted by using any appropriate medium, including but not limited to: a wireless medium, a wire, an optical cable, radio frequency (RF), or the like, or any suitable combination thereof.

The flowcharts and block diagrams in the accompanying drawings show architectures, functions, and operations that may be implemented for the method, the apparatus, and the computer program product according to the embodiments of the present disclosure. In this regard, each box in a flowchart or a block diagram may represent a module, a program segment, or a part of code. The module, the program segment, or the part of code includes one or more executable instructions used for implementing designated logic functions. In some implementations used as substitutes, functions annotated in boxes may alternatively occur in a sequence different from that annotated in an accompanying drawing. For example, actually two boxes shown in succession may be performed basically in parallel, and sometimes the two boxes may be performed in a reverse sequence. This is determined by a related function. Each box in a block diagram and/or a flowchart and a combination of boxes in the block diagram and/or the flowchart may be implemented by using a dedicated hardware-based system configured to perform a specified function or operation, or may be implemented by using a combination of dedicated hardware and a computer instruction.

The involved units described in the embodiments of the present disclosure may be implemented in a software manner, or may be implemented in a hardware manner, and the described units may also be disposed in a processor. Names of the units do not constitute a limitation on the units in a specific case.

In another aspect, this application further provides a computer-readable storage medium. The computer-readable storage medium may be included in the electronic device described in the above embodiments, or may exist alone without being assembled into the electronic device. The computer-readable storage medium carries one or more programs, the one or more programs, when executed by the electronic device, causing the electronic device to implement the method described in the following embodiments. For example, the electronic device may implement steps shown in FIG. 5, FIG. 6, FIG. 7, FIG. 8, FIG. 9, FIG. 10, FIG. 11, FIG. 12, FIG. 13, FIG. 14, or FIG. 15.

In edge computing (EC), by deploying an AS to a location close to a user equipment (UE), a communication delay between the UE and the application server (AS) is minimized. The protocol TR23.748 of Release 17 published by 3rd Generation Partnership Project (3GPP) is performing standardization study on EC.

Although an exemplary description is made by using the EC architecture in TR23.748 as a baseline of the solution to EC in the embodiments of the present disclosure, the present disclosure is not limited thereto. In other embodiments, the solution may alternatively be extensively adapted to other EC architectures.

Figure 2:
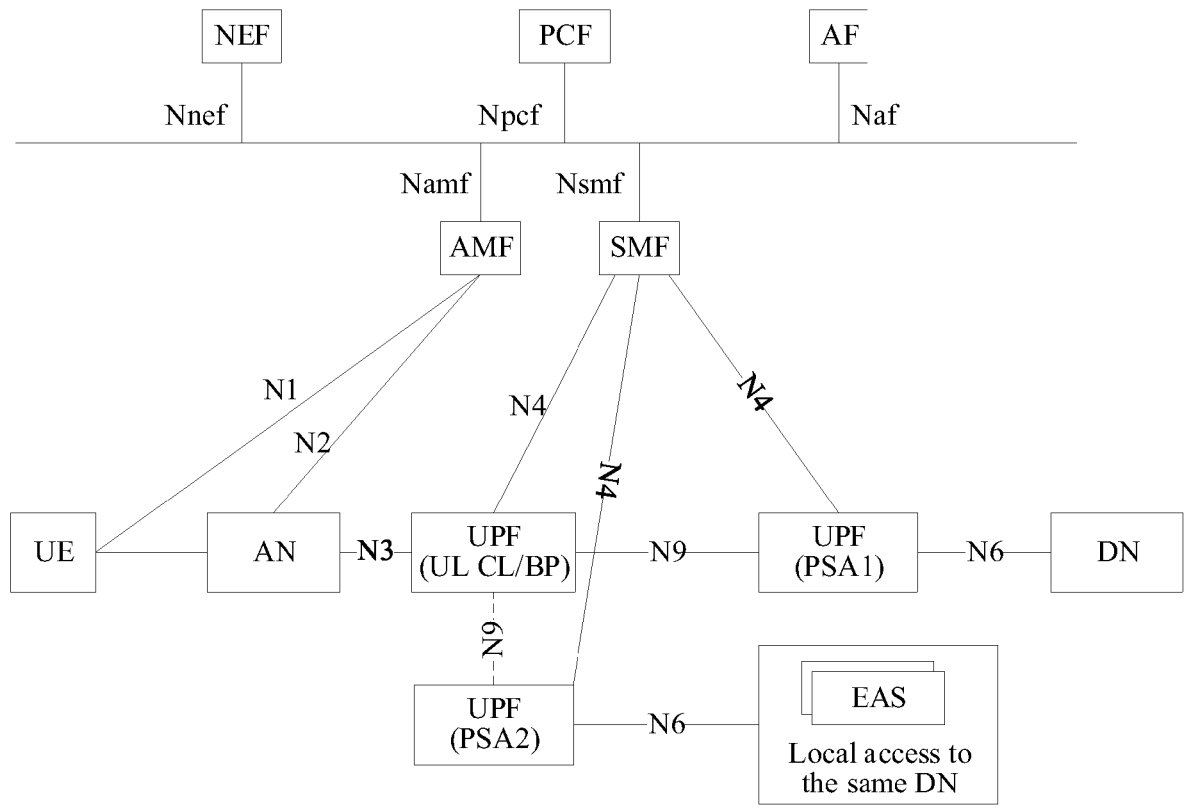
FIG. 2 is a schematic diagram of another EC architecture.

FIG. 1 is a schematic diagram of an EC architecture. FIG. 2 is a schematic diagram of another EC architecture.

Two basic architectures are included to implement EC, and are respectively shown in FIG. 1 and FIG. 2.

In FIG. 1, a user plane function (UPF)/protocol data unit (PDU) session anchor (PSA) is deployed near a base station (access network (AN)), and meanwhile an edge application server (AS) (EAS) is deployed in a data network (DN) connected to the PSA.

In FIG. 2, when a UPF/PSA1 is deployed in a center location, by deploying an uplink classifier (UL CL)/branching point (BP) close to a base station AN and then extending a UPF/PSA2 close to the base station as a branch, an EAS is deployed in the same DN to which local access is made and that is connected to a PSA2.

That is, in FIG. 1, access to the EAS is made without the UL CL/BP, while in FIG. 2, access to the EAS is made with the UL CL/BP.

In FIG. 1 and FIG. 2, a network exposure function (NEF) is shown, and Nnef refers to an Nnef message indicating that a service provided by the NEF is obtained. A policy control function (PCF) is shown, and Npcf refers to an Npcf message indicating that a service provided by the PCF is obtained. An Application function (AF) is shown, and Naf refers to an Naf message indicating that a service provided by the AF is obtained. An access and mobility management function (AMF) is shown, and Namf refers to an Namf message indicating that a service provided by the AMF is obtained. A session management function (SMF) is shown, and Nsmf refers to an Nsmf message indicating that a service provided by the SMF is obtained. The UE and the AMF interact with each other through an N1 interface, the AMF and the AN interact with each other through an N2 interface, the SMF and the UPF interact with each other through an N4 interface, the AN and the UPF interact with each other through an N3 interface, the UPF and the DN interact with each other through an N6 interface, and the UPFs interact with each other through an N9 interface.

In TR23.748, it is determined that the following key issue (KI) needs to be resolved: When the UE is moved, how to migrate the EAS, to keep service continuity and implement EC communication (for example, the communication delay is very small). Alternatively, when the EAS is migrated while the UE is not moved, how to keep service continuity and implement EC communication (for example, the communication delay is very small).

For details, reference may be made to the description of 5.2.1 of chapter 5.2 "KI #2: Edge relocation" of TR23.748:

With EC being deployed for $5^{th}$ generation (5G) systems, UE mobility and AS relocation need to be considered when designing solutions for optimal deployment of edge solutions. For example, as the UE moves across the 5G system, the UE location may change and require the network and the edge to deal with the change of the UE location. 3GPP Rel-16 specifications already address some of these aspects and the KI is to study potential improvements.

Clause 6.5.2 of TS 22.261 contains requirements that are related to this KI. SA WG1 defined the term Service Hosting Environment that has been translated and broadened in SA WG2 work in the present technical report (TR) to Edge Hosting Environment as the environment providing support required for EAS's execution. The requirements from SA WG1 are thus being interpreted as applying to the Edge Hosting Environment.

The following scenarios of UE mobility and AS relocation will be investigated:

Change of the serving EAS with no change of DN access identifier (DNAI). This includes: Change of the serving EAS with no change of DNAI. This includes change of the EAS, for example, due to the serving EAS becoming congested or being in outage condition. This assumes EAS Internet Protocol (IP) address change.

Change of the DNAI depending on the location of the UE to better serve the UE. This may imply EAS IP address change but in some cases the old EAS may be kept as long as the UE transaction is not over.

The technical solutions provided in the embodiments of the present disclosure may be used for resolving the foregoing KI. The 3GPP protocols TS23.501 and TS23.502 already define some mechanisms (which are described below in FIG. 3 and FIG. 4), and these mechanisms may resolve this KI. The solution provided in the embodiments of the present disclosure is to enhance the mechanisms defined in TS23.501 and TS23.502, thereby more effectively resolving Edge Relocation.

Figure 3:
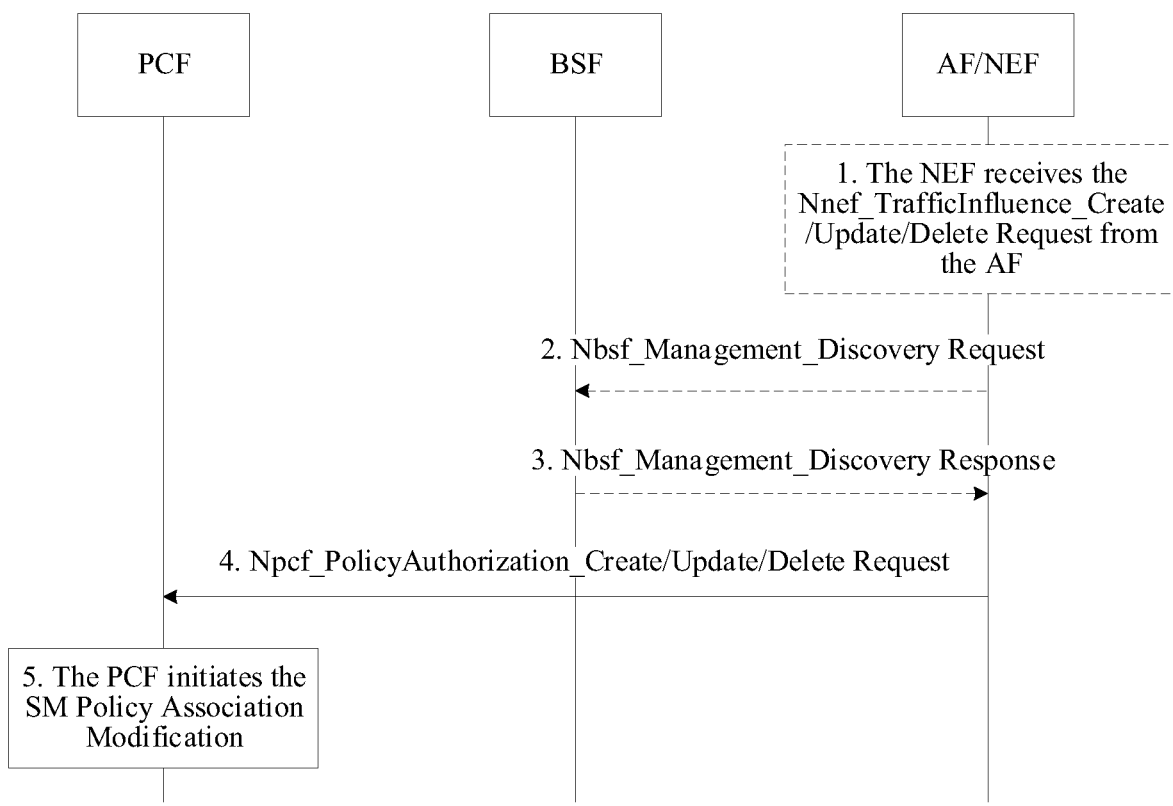
FIG. 3 is a flowchart of an application function (AF) request targeting an individual user equipment (UE) for AF influence on traffic routing.

FIG. 3 is a flowchart of an AF request targeting an individual UE for AF influence on traffic routing.

Chapter 5.6.7 of 3GPP protocol TS23.501 gives detailed descriptions of functions of AF influence on traffic routing (AF influence on traffic routing), and provides a related parameter table, as shown in Table 1.

Chapter 4.3.6 of 3GPP protocol TS23.502 gives flowcharts in different scenarios. FIG. 3 shows a process of an AF request targeting an individual UE for AF influence on traffic routing (Transferring an AF request targeting an individual UE address to the relevant PCF).

As shown in FIG. 3, the following operations may be included:

In operation 1, if the AF sends the AF request via the NEF, the AF sends Nnef_TrafficInfluence_Create/Update/Delete Request targeting an individual UE address to the NEF. This request corresponds to an AF request to influence traffic routing that targets an individual UE address. When the NEF receives an AF request from the AF, the NEF ensures the necessary authorization control and mapping from the information provided by the AF into information needed by the 5G core network (5GC). The NEF responds to the AF.

In operation 2, the AF/NEF consumes the Nbsf_Management_Discovery service operation (providing at least the UE address) to find out the address of the relevant PCF if the PCF address is not available on the NEF based on local configuration; otherwise, step 1 is skipped. The AF/NEF finds the binding supporting function (BSF) based on local configuration or using the NF repository function (NRF).

In operation 3, the BSF provides the PCF address in the Nbsf_Management_Discovery response to the AF/NEF.

In operation 4, if operation 1 was performed, the NEF invokes the Npcf_PolicyAuthorization service to the PCF to transfer the AF request. If an AF sends the AF request directly to the PCF, the AF invokes Npcf_PolicyAuthorization service and the PCF responds to the AF.

In operation 5, the PCF updates the SMF with a corresponding new policy control and charging (PCC) rule, and the PCF initiates the SM Policy Association Modification procedure. When a PCC rule is received from the PCF, the SMF may take appropriate actions, when applicable, to reconfigure the user plane of the PDU session, such as (1) add, replace, or remove a UPF in the data path, for example, to act as UL CL, BP, and/or PSA, (2) allocate a new prefix to the UE, and (3) update the UPF regarding the target DNAI with a new traffic steering rule.

It may be understood from FIG. 3 that, the AF may directly transmit the Npcf_PolicyAuthorization_Create/Update/Delete Request message to the PCF; or the AF may first transmit the Nnef_TrafficInfluence_Create/Update/Delete Request message to the NEF, and then transmit the Npcf_PolicyAuthorization_Create/Update/Delete Request message to the PCF through the NEF. AF influence on traffic routing parameters provided by the AF to the NEF and AF influence on traffic routing parameters provided by the AF/NEF to the PCF are given below.

Chapter 5.4.3.3.3 of 3GPP protocol TS29.522 gives influence on traffic routing (Application Function influence on traffic routing) parameters provided by the AF to the NEF, as shown in Table 1:

TABLE 1

| Attribute name | Data type | Description |
|---|---|---|
| appReloInd | Boolean | Identify whether an application may be relocated once a location of the application has been selected. |
| trafficFilters | array (flow information) | Identify IP packet filters. |
| ethTrafficFilters | array (Ethernet flow description) | Identify Ethernet packet filters. |
| trafficRoutes | array (route to location) | Determine the N6 traffic routing requirement. |
| tfcCorrInd | Boolean | Indication of traffic correlation. May only be included when "externalGroupId" attribute was included within the traffic influsub data type previously. It is used to indicate that for the group of UEs, the targeted PDU sessions are to be correlated by a common DNAI. |
| tempValidities | array (temporal validity) | Indicates the time interval(s) during which the AF request is to be applied. |
| validGeoZoneIds | array (string) | Identifies a geographic zone that the AF request applies only to the traffic of UE(s) located in this specific zone. |
| afAckInd | Boolean | Identifies whether the AF acknowledgment of uplink (UP) path event notification is required. |
| addrPreserInd | Boolean | Indicates whether the UE IP address is preserved. |

In Table 1, N is a positive integer greater than or equal to 1.

Chapter 5.6.2.13 of 3GPP protocol TS29.514 gives influence on traffic routing parameters provided by the AF/NEF to the PCF, as shown in Table 2.

TABLE 2

| Attribute name | Data type | Description | Applicability |
|---|---|---|---|
| appReloc | Boolean | Indication of application relocation possibility. When it is included and set to "true", it indicates that once a 5GC selects a location of an application, the application cannot be relocated. A default value is "false". | InfluenceOnTrafficRouting |
| routeToLocs | array (route to location) | List of traffic routes to locations of applications | InfluenceOnTrafficRouting |
| spVal | Spatial validity | Indicate a location required by traffic routing of the application. Absence of this attribute indicates no spatial restrictions. | InfluenceOnTrafficRouting |
| tempVals | array (temporal validity) | Indicates the time interval(s) during which the AF request is to be applied | InfluenceOnTrafficRouting |

TABLE 2-continued

| Attribute name | Data type | Description | Applicability |
|---|---|---|---|
| upPathChgSub | Uplink path change event | Subscription to uplink path management events | InfluenceOnTrafficRouting |
| addrPreserInd | Boolean | Indicates whether the UE IP address is preserved. | |

Chapter 5.6.7.1 in TS23.501 defines influence on traffic routing parameters provided by the AF to the NEF and the PCF, as shown in Table 3.

TABLE 3

| Information name | Applicable to PCF or NEF | Applicable to only NEF | Category |
|---|---|---|---|
| Traffic description | Define to-be-influenced target data, represented by a combination of a data network name (DNN) and optional single network slice selection assistance information (S-NSSAI), and an application identifier or traffic filtering information. | The target traffic may be represented by AF-Service-Identifier, instead of the combination of the DNN and the optional S-NSSAI. | Mandatory |
| Potential locations of applications | Indicates potential locations of applications, represented by a list of DNAI(s) | The potential locations of applications may be represented by AF-Service-Identifier | Conditional |
| Target UE identifier(s) | Indicates the UE(s) that the request is targeting, i.e. An individual UE, a group of UEs represented by an Internal Group Identifier, or any UE accessing the combination of DNN, S-NSSAI and DNAI(s). | Generic public subscription identifier (GPSI) may be used to identify the individual UE, or an External Group Identifier may be used to identify a group of UEs. | Mandatory |
| Spatial validity condition | Indicates that the request applies only to the traffic of UE(s) located in the specified location, represented by areas of validity. | The specified location may be represented by a list of geographic zone identifier(s). | Optional |
| AF service identifier | The AF service identifier refers to the AF request. | N/A | Mandatory |
| Traffic routing requirements | Routing profile ID and/or N6 traffic routing information, corresponding to each DNAI and/or an indication used for processing traffic having an unknown target address and an optional indication of traffic correlation | N/A | Optional |
| Application relocation possibility | Indicate whether an application may be relocated once a location of the application has been selected by the 5GC | N/A | Optional |
| UE IP address preservation indication | Indicates that the UE IP address is to be preserved | N/A | Optional |
| Temporal validity condition | Time interval(s) or duration(s) | N/A | Optional |
| Information on AF subscription to SMF events | Indicates whether the AF subscribes to change of UP path of the PDU Session and the parameters of this subscription. | N/A | Optional |

Table 3 shows parameters defined by chapter 5.6.7.1 in TS23.501, Table 1 and Table 2 show detailed definitions of the foregoing parameters, and they are consistent.

RouteToLocation (route to location) in 3GPP protocol TS29.571 corresponds to Traffic Routing requirements in TS23.501 and TS23.502, as shown in Table 4.

TABLE 4

| Attribute name | Data type | Description |
| --- | --- | --- |
| dnai | DNAI | Indicates the location of the application |
| routeInfo | route information | Includes the traffic routing information |
| routeProfId | String | Indicates the routing profile Id |

It may be understood from Table 4 that, each DNAI includes N6 traffic routing information and a routing profile ID. The routing profile ID is only a string, and an N6 Traffic Routing function corresponding thereto is negotiated in advance in standards by an operator and the AF, and configured on the AF and a 5G network. That is to say, the N6 Traffic Routing function corresponding to the Routing Profile ID is not defined in the standards.

Chapter 5.4.4.16 in TS29.571 defines route information (RouteInformation), as shown in Table 5.

TABLE 5

| Attribute name | Data type | Description |
| --- | --- | --- |
| ipv4Addr | Ipv4Addr | IPv4 address of the tunnel end point in the DN |
| ipv6Addr | Ipv6Addr | IPv6 address of the tunnel end point in the DN |
| portNumber | Uinteger | UDP port number of the tunnel end point in the DN |

From the perspective of the foregoing definition of RouteInformaiton, the related art supports only a tunnel routing technology based on the user datagram protocol (UDP).

Figure 4:
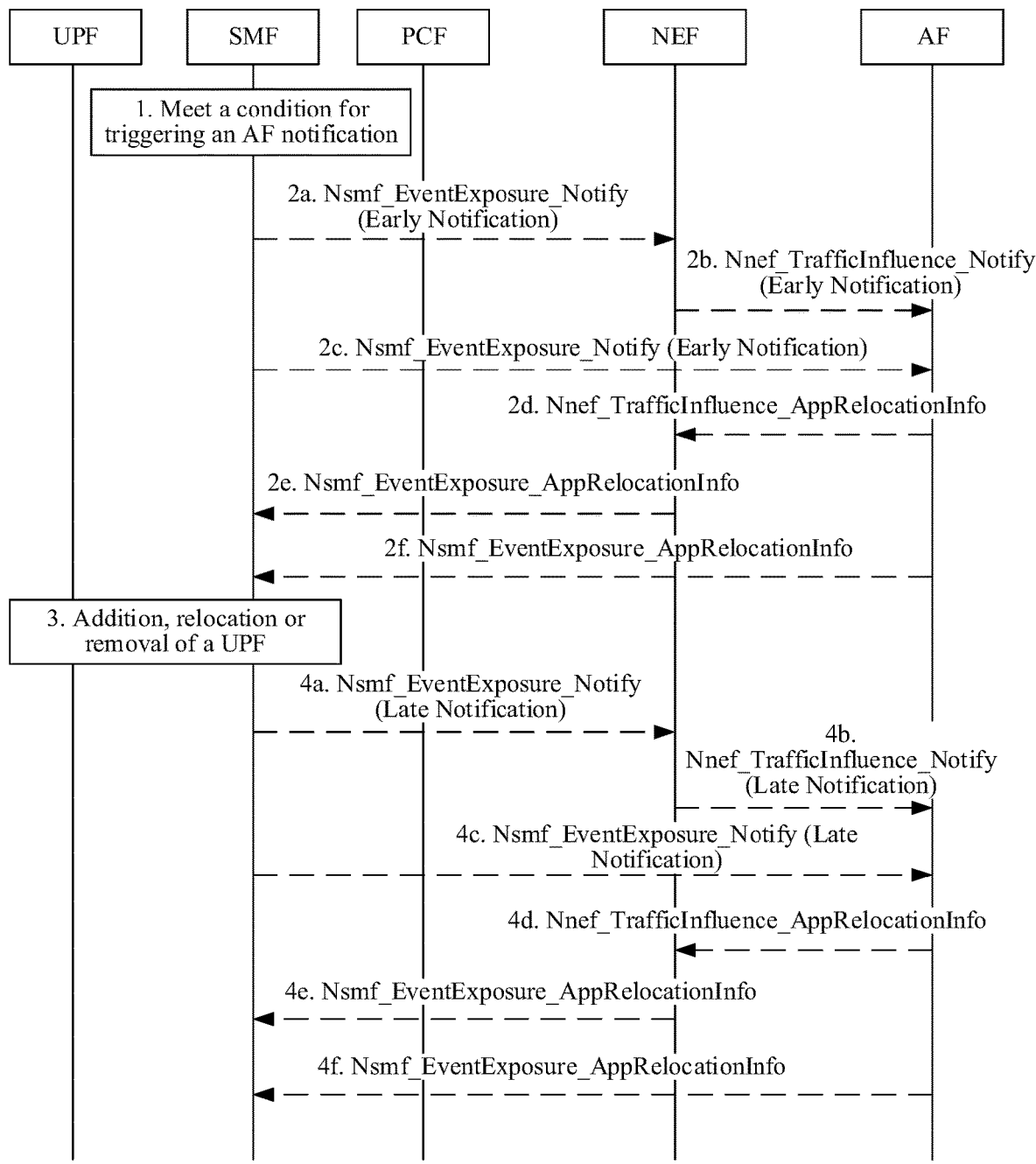
FIG. 4 is a flowchart of notification of user plane management events.

Chapter 4.3.6.3 of TS23.502 gives a schematic flowchart of notification of user plane management events shown in FIG. 4.

FIG. 4 is a flowchart of notification of user plane management events. As shown in FIG. 4, the process includes the following operations:

In operation 1, the condition for triggering an AF notification has been met. The SMF transmits the notification to the NF subscribing to an SMF notification. Further processing of the SMF notification depends on the NF receiving the notification, as shown in operations 2a and 2c.

In operation 2a, the early notification via the NEF is requested by the AF, the SMF notifies the NEF of the target DNAI of the PDU session by invoking the Nsmf_EventExposure_Notify service operation.

In operation 2b, when the NEF receives Nsmf_EventExposure_Notify, the NEF performs mapping (for example, AF service internal ID provided in notification correlation ID to AF service ID, subscription permanent identifier (SUPI) to GPSI, and the like) according to the information, and triggers the appropriate Nnef_TrafficInfluence_Notify message. In this case, operation 2c is not applicable.

In operation 2c, if early direct notification is requested by the AF, the SMF notifies the AF of the target DNAI of the PDU session by invoking the Nsmf_EventExposure_Notify service operation.

In operation 2d, the AF replies to Nnef_TrafficInfluence_Notify by invoking the Nnef_TrafficInfluence_AppRelocationInfo service operation either immediately or after any required application relocation in the target DNAI is completed. The AF includes N6 service routing details corresponding to the target DNAI. The AF may reply in negative for Nnef_TrafficInfluence_Notify e.g. If the AF determines that the application relocation cannot be completed successfully and/or on time.

In operation 2e, when the NEF receives Nnef_TrafficInfluenceAppRelocationInfo, the NEF triggers the corresponding Nsmf_EventExposure_AppRelocationInfo message.

In operation 2f, the AF replies to Nsmf_EventExposure_Notify by invoking the Nsmf_EventExposure_AppRelocationInfo service operation either immediately or after any required application relocation in the target DNAI is completed. The AF includes N6 service routing details corresponding to the target DNAI. The AF may reply in negative for Nsmf_EventExposure_Notify e.g. If the AF determines that the application relocation cannot be completed successfully on time.

In operation 3, the SMF enforces the change of DNAI or addition, change or removal of a UPF.

If the runtime coordination between 5GC and AF is enabled based on local configuration, according to the indication of "AF acknowledgment to be expected" included in AF subscription to SMF events, the SMF may wait for a response from the AF to the early notification before this step. The SMF does not perform this operation until it receives a positive response from the AF.

In operation 4a, if late notification is requested by the AF via the NEF, the SMF notifies the NEF of the target DNAI of the PDU session by invoking the Nsmf_EventExposure_Notify service operation.

If the runtime coordination between 5GC and AF is enabled based on local configuration, according to the indication of "AF acknowledgment to be expected" included in AF subscription to SMF events, the SMF may send late notification and wait for a positive response from the AF before activating the new UP path.

In operation 4b, when the NEF receives Nsmf_EventExposure_Notify, the NEF performs mapping (for example, AF service internal ID provided in notification correlation ID to AF service ID, SUPI to GPSI, and the like) according to the information, and triggers the appropriate Nnef_EventExposure_Notify message. In this case, operation 4c is not applicable.

In operation 4c, if late direct notification is requested by the AF, the SMF notifies the AF of the target DNAI of the PDU session by invoking the Nsmf_EventExposure_Notify service operation.

In operation 4d, the AF replies to Nnef_TrafficInfluence_Notify by invoking the Nnef_TrafficInfluence_AppRelocationInfo service operation either immediately or after any required application relocation in the target DNAI is completed. The AF includes N6 service routing details corresponding to the target DNAI. The AF may reply in negative for Nnef_TrafficInfluence_Notify, for example, if the AF determines that the application relocation cannot be completed successfully on time.

In operation 4e, when the NEF receives Nnef_TrafficInfluenceAppRelocationInfo, the NEF triggers the corresponding Nsmf_EventExposure_AppRelocationInfo message.

In operation 4f, the AF replies to Nsmf_EventExposure_Notify by invoking the Nsmf_EventExposure_AppRelocationInfo service operation either immediately or after any required application relocation in the target DNAI is completed. The AF includes N6 service routing details corresponding to the target DNAI. The AF may reply in negative for Nsmf_EventExposure_Notify, for example, if the AF determines that the application relocation cannot be completed successfully on time.

The aforementioned KI includes change of the DNAI depending on the location of the UE to better serve the UE. This may imply EAS IP address change but in some cases the old EAS may be kept as long as the UE service is not over. This issue may alternatively be resolved by applying the function defined in chapter 4.3.6.3 in TS23.502.

As shown in FIG. 4, this notification includes two situations, where one is an early notification, and the other is a late notification.

However, as described above, the related art supports only a tunnel routing technology based on the UDP.

3GPP protocol TS29.508 defines Event Notification of the SMF, and reference may be made to Tables 6, 7, and 8.

TABLE 6

Definition of type EventNotification

| Attribute name | Data type | Description |
| --- | --- | --- |
| event | Smf event | Event that is notified |
| timeStamp | Data time | Time at which the event is observed |
| supi | SUPI | SUPI. It is included when the subscription applies to a group of UE(s) or any UE. |
| gpsi | GPSI | Identifies a GPSI. It is included when it is available and the subscription applies to a group of UE(s) or any UE. |
| sourceDnai | DNAI | Source DNAI. Shall be included for event "UP_PATH_CH" if the DNAI changed |
| targetDnai | DNAI | Target DNAI. Shall be included for event "UP_PATH_CH" if the DNAI changed |
| dnaiChgType | DNAI change type | DNAI change type. Shall be included for event "UP_PATH_CH" |
| sourceUeIpv4Addr | Ipv4Addr | The IPv4 Address of the served UE for the source DNAI. May be included for event "UP_PATH_CH" |
| sourceUeIpv6Prefix | Ipv6Prefix | The IPv6 Address prefix of the served UE for the source DNAI. May be included for event "UP_PATH_CH" |
| targetUeIpv4Addr | Ipv4Addr | The IPv4 Address of the served UE for the target DNAI. May be included for event "UP_PATH_CH" |
| targetUeIpv6Prefix | Ipv6Prefix | The IPv6 Address prefix of the served UE for the target DNAI. May be included for event "UP_PATH_CH" |
| sourceTraRouting | Route to location | N6 traffic routing information for the source DNAI. Shall be included for event "UP_PATH_CH" (if available) |
| targetTraRouting | Route to location | N6 traffic routing information for the target DNAI. Shall be included for event "UP_PATH_CH" (if available) |
| ueMac | MacAddr48 | UE MAC address. May be included for event "UP_PATH_CH" |
| adIpv4Addr | Ipv4Addr | Added IPv4 address(es). May be included for event "UE_IP_CH". |
| adIpv6Prefix | Ipv6Prefix | Added IPv6 address prefix(es). May be included for event "UE_IP_CH". |
| reIpv4Addr | Ipv4Addr | Removed IPv4 address(es). May be included for event "UE_IP_CH". |
| reIpv6Prefix | Ipv6Prefix | Removed IPv6 address prefix(es). May be included for event "UE_IP_CH". |
| plmnId | PLMN ID | New PLMN ID. |
| accType | Access type | New access type. |
| pduSeId | PDU session ID | PDU session ID. |
| dddStatus | DI data delivery status | Downlink data delivery status (discarded, transmitted, buffered). Shall be included for event "downlink data delivery status" |
| maxWaitTime | Data time | The estimated maximum waiting time for downlink data delivery shall be included for event "downlink data delivery status" with status "BUFFERED" |
| dddTraDescriptor | Ddd traffic descriptor | The downlink data descriptor impacted by downlink data delivery status change. |
| commFailure | Communication failure | Describes the communication failure cause for the UE. |
| ipv4Addr | Ipv4Addr | IPv4 address. |
| ipv6Prefixes | array (Ipv6Prefix) | IPv6 prefix. |
| ipv6Addrs | array (Ipv6Addr) | IPv6 address. |
| pduSessType | PDU session type | PDU session type |
| qfi | QFI | QoS flow identifier |
| appId | Application ID | Contains the application ID |
| ethfDescs | array (Ethernet flow description) | Contains the flow description for the Uplink and/or Downlink Ethernet flows. |

TABLE 6-continued

Definition of type EventNotification

| Attribute name | Data type | Description |
| --- | --- | --- |
| fDescs | array (flow description) | Contains the flow description for the Uplink and/or Downlink IP flows. |
| dnn | DNN | DNN |
| snssai | S-NSSAI | Identifies the slice information. |
| ulDelays | array (Uinteger) | Uplink packet delay in units of milliseconds. |
| dlDelays | array (Uinteger) | Downlink packet delay in units of milliseconds. |
| rtDelays | array (Uinteger) | Round trip delay in units of milliseconds. |

TABLE 7

Definition of NsmfEventExposureNotification type

| Attribute name | Data type | Description |
| --- | --- | --- |
| notifId | String | Notification correlation ID used to identify the subscription which the notification is corresponding to. |
| eventNotifs | array (event notification) | Notifications about Individual Events |
| ackUri | Uri | The URI provided by the SMF for the AF acknowledgment. If present, it only applies to the "UP_PATH_CH" event indicated in the "eventNotifs" attribute. |

TABLE 8

SMF event enumeration

| Enumeration value | Description |
| --- | --- |
| AC_TY_CH | Access Type Change |
| UP_PATH_CH | UP Path Change |
| PDU_SES_REL | PDU Session Release |
| PLMN_CH | PLMN Change |
| UE_IP_CH | UE IP address change |
| DDDS | Downlink data delivery status |
| COMM_FAIL | Communication failure |
| PDU_SES_EST | PDU Session Establishment |

TABLE 8-continued

SMF event enumeration

| Enumeration value | Description |
| --- | --- |
| QFI_ALLOC | QFI allocation |
| QOS_MON | QoS Monitoring |

It may be known from the foregoing Tables 6 to 8 that, the NsmfEventExposureNotification (Nsmf event exposure notification) message provided by the SMF to the AF/NEF because of the user plane path modification includes one or more EventNotification, and each EventNotification describes one notification event (that is, one report may include reports of a plurality of events), where one EventNotification includes some parameters, as shown in Table 6, including:

SUPI+GPSI;
Source DNAI;
Target DNAI;
DNAI Change Type;
Source UE IP address;
Target UE IP address;
Source N6 Traffic Routing information; and
Target N6 Traffic Routing information.

The influence on traffic routing Notification parameters defined in TS29.522 and provided by the NEF to the AF are shown in Tables 9 and 10.

TABLE 9

Definition of type EventNotification

| Attribute name | Data type | Description |
| --- | --- | --- |
| afTransId | String | Identifies an NEF Northbound interface service generated by the AF. |
| dnaiChgType | DnaiChangeType | Identifies the type of notification regarding UP path management event. |
| sourceTrafficRoute | RouteTo Location | Identifies the N6 traffic routing information associated with the source DNAI. May be present if the "subscribedEvent" is set to "UP_PATH_CHANGE". |
| subscribedEvent | SubscribedEvent | Identifies a UP path management event the AF requested to be notified of. |
| targetTrafficRoute | RouteToLocation | Identifies the N6 traffic routing information associated with the target DNAI. May be present if the "subscribedEvent" is set to "UP_PATH_CHANGE". |
| sourceDnai | Dnai | Source DNAI. Shall be included for event "UP_PATH_CHANGE" if the DNAI changed |
| targetDnai | Dnai | Target DNAI. Shall be included for event "UP_PATH_CHANGE" if the DNAI changed |
| gpsi | Gpsi | Identify one user |
| srcUeIpv4Addr | Ipv4Addr | The IPv4 Address of the served UE for the source DNAI. |

TABLE 9-continued

Definition of type EventNotification

| Attribute name | Data type | Description |
| --- | --- | --- |
| srcUeIpv6Prefix | Ipv6Prefix | The IPv6 Address prefix of the served UE for the source DNAI. |
| tgtUeIpv4Addr | Ipv4Addr | The IPv4 Address of the served UE for the target DNAI. |
| tgtUeIpv6Prefix | Ipv6Prefix | The IPv6 Address prefix of the served UE for the target UE. |
| ueMac | MacAddr48 | UE MAC address of the served UE |
| afAckUri | Link | The URI provided by the SMF for the AF acknowledgment. May only be included for event "UP_PATH_CHANGE". |

TABLE 10

DnaiChangeType enumeration

| Enumeration value | Description |
| --- | --- |
| EARLY | Early notification of UP path reconfiguration |
| EARLY_LATE | Early notification and late notification of UP path reconfiguration. This value shall only be present in the subscription to the DNAI change event. |
| LATE | Late notification of UP path reconfiguration |

It may be understood from the foregoing Tables 9 and 10 that, the parameters included in the EventNotification message because of the user plane path modification and provided by the NEF to the AF are almost the same as the parameters provided by the SMF (referring to Tables 6 to 8), but do not include the SUPI. The SUPI is usually not allowed to be provided to the AF.

Table 10 gives some possible values of DnaiChangeType, which may be only the value EARLY or LATE during EventNotification, but the AF may subscribe to event notifications simultaneously during subscription to the event notifications, that is, the SMF needs to report the event notifications in both the early and late stages.

The technical solution provided in the embodiments of the present disclosure not only may resolve the EC KI #2 issue, but also may resolve a non-EC issue. Therefore, the to-be-resolved issue is not particularly described below again, that is, the issue does not particularly refer to the EC KI #2 issue, and instead the issue is universalized, that is, the (E)AS mentioned below may be EAS or AS.

From the perspective of the foregoing definition of RouteInformaiton, the related art supports only a tunnel routing technology based on the UDP. An embodiment of the present disclosure proposes an innovative routing technology in which a reverse NAT (NAT) technology is used, which may resolve the following technical issues without the Tunnel:

Issue 1. When the (E)AS is migrated while the UE is not moved, how to keep service continuity and implement EC communication (for example, the communication delay is very small).

The embodiments of the present disclosure provide that, before or after the (E)AS is migrated, the (E)AS notifies the AF, and the AF transmits related parameters to the 5G network, for example, the target DNAI for the migration of the (E)AS and the supported N6 routing manner and parameter (NAT translation parameter). Then, the 5G network performs traffic rerouting of the UE (including NAT, and insertion or modification of UL CL/BP) according to these parameters.

Issue 2. When the UE is moved, how to migrate the E(AS), to keep service continuity and implement EC communication (for example, the communication delay is very small).

The embodiments of the present disclosure provide that, before or after user plane modification after the UE is moved, the SMF notifies the following parameters to the AF (through the NEF, or directly to the AF): a list of target DNAI(s) supported after the UE is moved, the supported N6 routing manner and parameter (NAT translation parameter), and the like. The AF determines to migrate the (E)AS, and replies to the 5G network with the selected parameters for movement of the (E)AS (for example, the N6 routing manner and parameter). Then, the 5G network performs traffic rerouting of the UE (including NAT, and insertion or modification of UL CL/BP) according to these parameters.

The following exemplarily describes a method according to an embodiment of the present disclosure with reference to FIG. 5 to FIG. 16.

Figure 5:
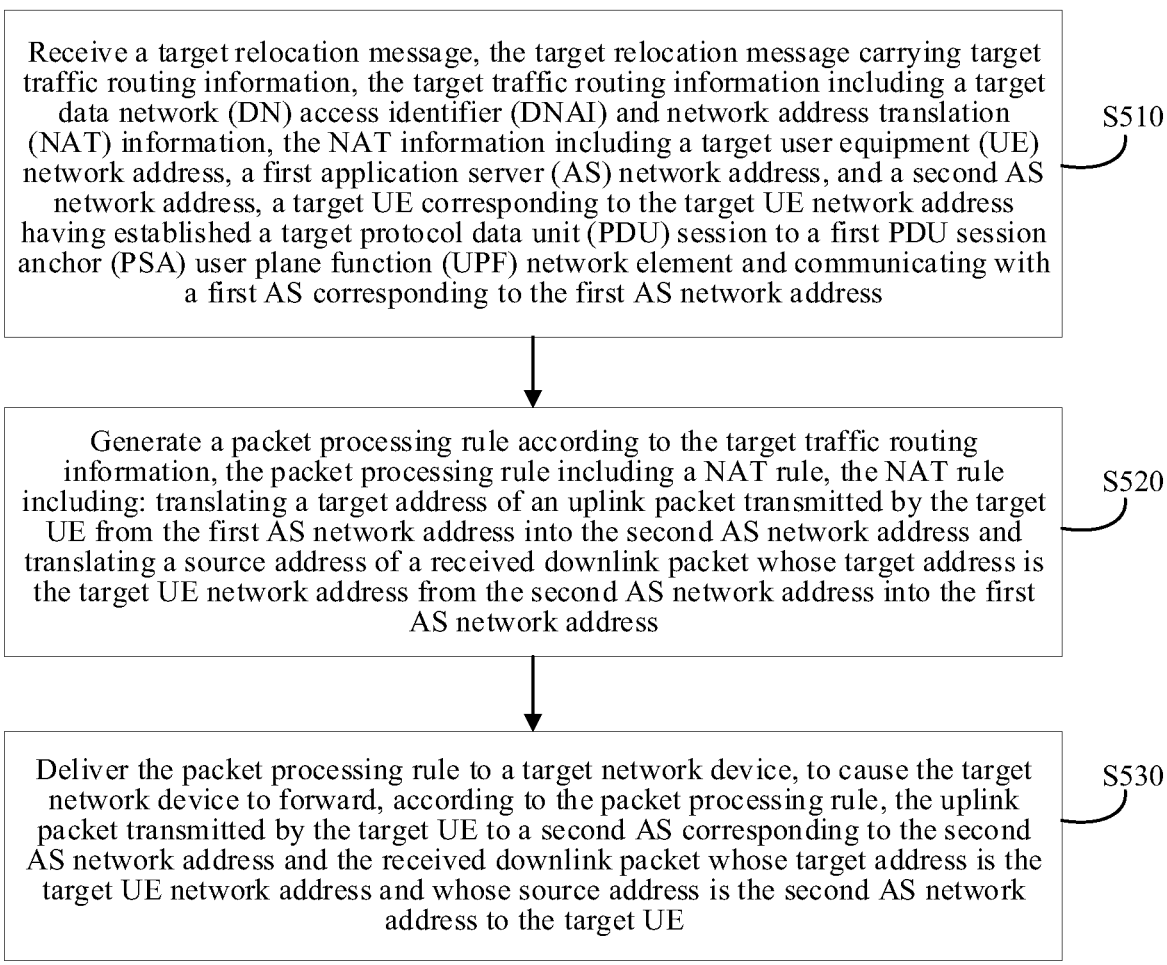
FIG. 5 is a flowchart of a method for implementing service continuity according to an embodiment.

FIG. 5 is a flowchart of a method for implementing service continuity according to an embodiment. The method provided in the embodiment in FIG. 5 may be performed by a SMF network element, for example, an SMF, but the present disclosure is not limited thereto. As shown in FIG. 5, the method provided in this embodiment of the present disclosure may include the following operations:

In operation S510, the system receives a target relocation message, where the target relocation message may carry target traffic routing information, the target traffic routing information may include a target DNAI and NAT information, and the NAT information may include a target UE network address, a first AS network address, and a second AS network address, where a target UE corresponding to the target UE network address has established a target PDU session to a first PSA UPF network element and communicates with a first AS corresponding to the first AS network address.

In an exemplary embodiment, before the target relocation message is received, the first AS has been migrated to the second AS through an AF network element.

In an exemplary embodiment, the target relocation message may include an SM policy control update notification message. The receiving a target relocation message may include receiving the SM policy control update notification message from a target PCF network element, where the SM policy control update notification message includes a source DNAI corresponding to the first PSA UPF network element, the target DNAI, and the target traffic routing information.

In an exemplary embodiment, the SM policy control update notification message may be generated by the target PCF network element according to a policy authorization request message received from a target NEF network element, and the policy authorization request message includes the target UE network address, the source DNAI, the target DNAI, and the target traffic routing information. The policy authorization request message may be generated by the target NEF network element according to an influence on traffic routing request message received from an AF network element, and the influence on traffic routing request message may include the target UE network address, the source DNAI, the target DNAI, and the target traffic routing information.

In an exemplary embodiment, the SM policy control update notification message may be generated by the target PCF network element according to an influence on traffic routing request message received from an AF network element, and the influence on traffic routing request message may include the target UE network address, the source DNAI, the target DNAI, and the target traffic routing information.

In an exemplary embodiment, the target relocation message includes an event exposure application relocation information message. The receiving a target relocation message may include receiving the event exposure application relocation information message from an AF network element, where the event exposure application relocation information message includes the target traffic routing information.

In an exemplary embodiment, before the target relocation message is received, the method may further include receiving an early event subscription message of the AF network element, deciding to perform PSA UPF network element modification, and transmitting an early event notification message to the AF network element according to the decision, where the early event notification message includes an event notification parameter, and the event notification parameter includes a source DNAI corresponding to the first PSA UPF network element and the target DNAI corresponding to a second PSA UPF network element.

In an exemplary embodiment, the method may further include triggering, by the AF network element according to the early event notification message, migration of the first AS from the source DNAI to the target DNAI, to serve as the second AS.

In operation S520, the system generates a packet processing rule according to the target traffic routing information, where the packet processing rule may include an NAT rule, and the NAT rule may include translating a target address of an uplink packet transmitted by the target UE from the first AS network address into the second AS network address and translating a source address of a received downlink packet whose target address is the target UE network address from the second AS network address into the first AS network address.

In an exemplary embodiment, in a case that the target traffic routing information further includes a first port number of the first AS and a second port number of the second AS, the NAT rule may further include translating a target port number of the uplink packet from the first port number into the second port number and translating a source port number of the downlink packet from the second port number into the first port number.

In operation S530, the system delivers the packet processing rule to a target network device, to cause the target network device to forward, according to the packet processing rule, the uplink packet transmitted by the target UE to a second AS corresponding to the second AS network address and the received downlink packet whose target address is the target UE network address and whose source address is the second AS network address to the target UE.

In an exemplary embodiment, in a case that the target DNAI matches the source DNAI, the target network device may include the first PSA UPF network element. The delivering the packet processing rule to a target network device may include transmitting an N4 session modification request message to the first PSA UPF network element, where the N4 session modification request message includes the packet processing rule.

In an exemplary embodiment, the method may further include receiving an N4 session modification response message with which the first PSA UPF network element replies, and returning an SM policy control update notification response message to the target PCF network element, to cause the target PCF network element to return an influence on traffic routing response message to an AF network element, where after receiving the influence on traffic routing response message, the AF network element triggers to complete migration of the first AS to the second AS.

In an exemplary embodiment, in a case that the target DNAI does not match a source DNAI supported by the first PSA UPF network element, the target network device may include a second PSA UPF network element and an UP CL UPF network element, the packet processing rule may further include a packet forwarding rule, and the packet forwarding rule may include forwarding the received uplink packet whose source address is the target UE network address and whose target address is the first AS network address to the second PSA UPF network element. The delivering the packet processing rule to a target network device may include delivering the packet forwarding rule to the UP CL UPF network element, and delivering the NAT rule to the second PSA UPF network element.

In an exemplary embodiment, before the delivering the packet processing rule to a target network device, the method may further include determining the second PSA UPF network element, determining the UP CL UPF network element, updating a downlink user plane of the first PSA UPF network element, and updating a downlink user plane of the second PSA UPF network element.

In an exemplary embodiment, in a case that the target DNAI does not match a source DNAI supported by the first PSA UPF network element, the target network device may include an UP CL UPF network element. The delivering the packet processing rule to a target network device may include delivering the packet processing rule to the UP CL UPF network element.

In an exemplary embodiment, the packet processing rule may further include a packet forwarding rule. After the target relocation message is received, the method may further include determining the second PSA UPF network element and an UP CL UPF network element, and using the second PSA UPF network element and the UP CL UPF network element as the target network device. The delivering the packet processing rule to a target network device may include delivering the packet forwarding rule to the UP CL UPF network element, and delivering the NAT rule to the second PSA UPF network element.

In an exemplary embodiment, after the target relocation message is received, the method may further include determining the second PSA UPF network element and an UP CL UPF network element, and using the UP CL UPF network element as the target network device. The delivering the packet processing rule to a target network device may include delivering the packet processing rule to the UP CL UPF network element.

In an exemplary embodiment, before the target relocation message is received, the method may further include receiving a late event subscription message of the AF network element, deciding to perform PSA UPF network element modification, determining the second PSA UPF network element and an UP CL UPF network element according to the decision, configuring the UP CL UPF network element to forward the received uplink packet to the first PSA UPF network element, and transmitting a late event notification message to the AF network element, where the late event notification message includes an event notification parameter, and the event notification parameter includes a source DNAI corresponding to the first PSA UPF network element and the target DNAI corresponding to the second PSA UPF network element.

In an exemplary embodiment, the method may further include triggering, by the AF network element according to the late event notification message, migration of the first AS from the source DNAI to the target DNAI, to serve as the second AS.

In an exemplary embodiment, the packet processing rule may further include a packet forwarding rule. After the target relocation message is received, the method may further include using the second PSA UPF network element and the UP CL UPF network element as the target network device. The delivering the packet processing rule to a target network device may include delivering the packet forwarding rule to the UP CL UPF network element, and delivering the NAT rule to the second PSA UPF network element.

In an exemplary embodiment, after the target relocation message is received, the method may further include using the UP CL UPF network element as the target network device. The delivering the packet processing rule to a target network device may include delivering the packet processing rule to the UP CL UPF network element.

In the method for implementing service continuity provided in this embodiment of the present disclosure, in an aspect, use of an NAT technology may keep service continuity when an AS is migrated or when a UE has a location changed, which is simple in implementation and easy in deployment, and in another aspect, based on a related technical solution, an innovative technical solution is added, so that the system is not modified greatly, and it is easy to perform standardized and large-scale deployment.

Figure 6:
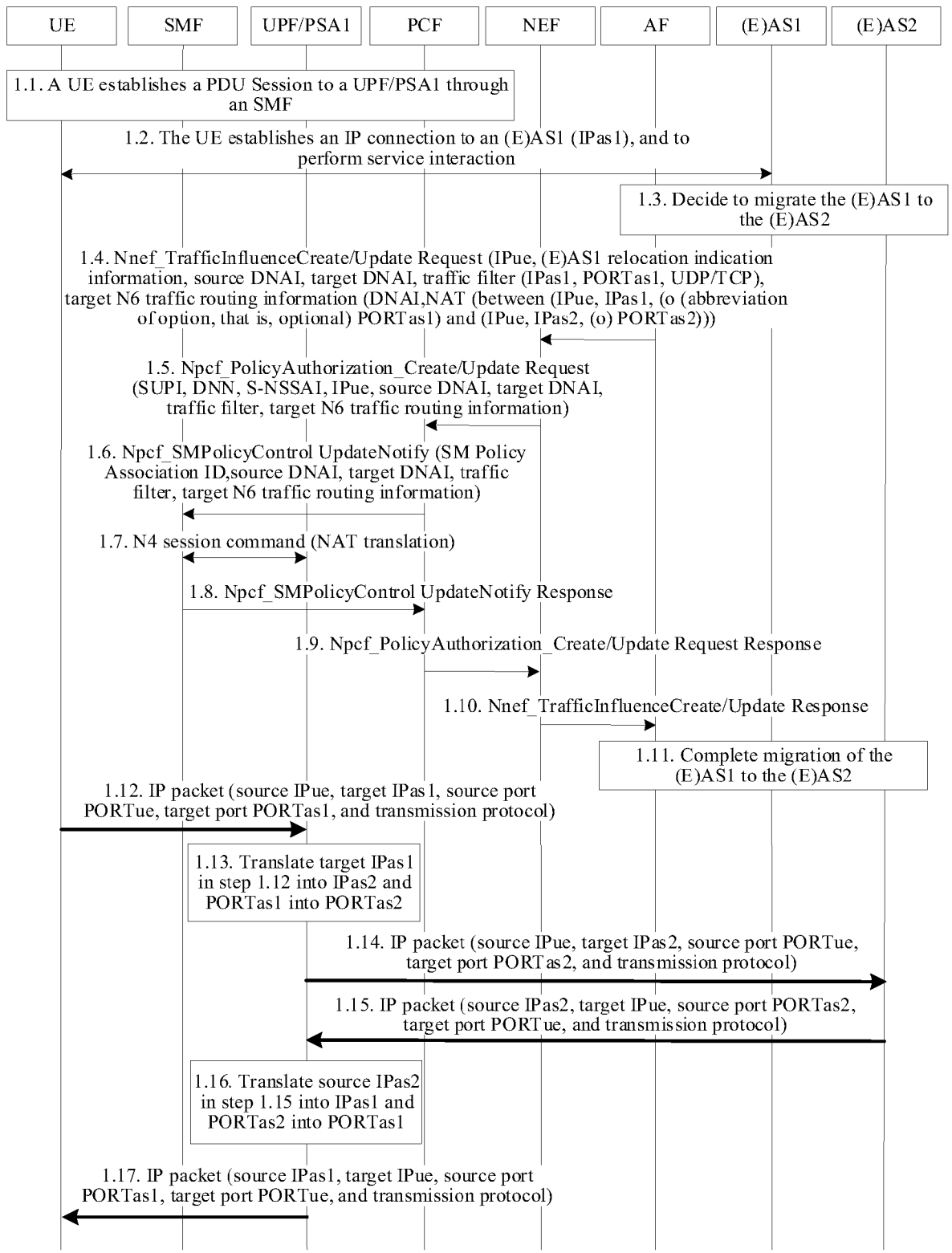
FIG. 6 is a flowchart of a method for implementing service continuity according to an embodiment of the present disclosure.

FIG. 6 is a flowchart of a method for implementing service continuity according to an embodiment. The embodiment in FIG. 6 describes (E)AS relocation in a case that a source DNAI is unchanged, that is, the source DNAI is the same as a target DNAI. As shown in FIG. 6, the method provided in this embodiment of the present disclosure may include the following operations:

In operation 1.1, a target UE establishes a target PDU Session to a UPF/PSA1 (a first PSA UPF network element) through an SMF (SM network element), where an IPv4 (IP version 4) address or an IPv6 (IP version 6) prefix is allocated to the target UE. In the following description, the IPv4 address and the IPv6 prefix are also collectively referred to as an IP address, and the IP address of the target UE is referred to as a target UE network address.

In operation 1.2, the target UE establishes an IP connection to an (E)AS1 (a first AS) through the allocated IP address, and performs IP communication to perform service interaction.

In operation 1.3, an AF decides to migrate the (E)AS1 to an (E)AS2 (a second AS).

For example, a virtual machine on which the (E)AS1 is run is migrated from a physical server to another physical server. The two physical servers may be in a same cloud data center, or may not be in a same cloud data center. When the two physical servers are in the same cloud data center, the two physical servers usually correspond to unchanged DNAIs, that is, the source DNAI corresponding to the (E)AS1 is the same as the target DNAI corresponding to the (E)AS2. When the two physical servers are not in the same cloud data center, DNAIs corresponding to the two physical servers differ, that is, the source DNAI corresponding to the (E)AS1 is different from the target DNAI corresponding to the (E)AS2. In the embodiment in FIG. 6, an exemplary description is made by using unchanged DNAIs as an example.

In operation 1.4, the AF may directly transmit a message to a target PCF (target PCF network element); or the AF may first transmit a message to a target NEF (target NEF network element), and then the target NEF transmits a message to the target PCF.

In the embodiment in FIG. 6, an exemplary description is made by using an example in which the AF transmits the Nnef_TrafficInfluenceCreate/Update Request message (referred to as an influence on traffic routing request message) to the target NEF. In other embodiments, the AF may alternatively directly transmit the Nnef_TrafficInfluenceCreate/Update Request message to the target PCF.

If it is the first time that the AF transmits the TrafficInfluence related message to the target NEF, the TrafficInfluence related message is the Nnef_TrafficInfluenceCreate Request message. If it is not the first time that the AF transmits the TrafficInfluence related message to the target NEF, the TrafficInfluence related message is the Nnef_TrafficInfluenceUpdate Request message.

In the embodiment in FIG. 6, IPue included in the Nnef_TrafficInfluenceCreate/Update Request message is the UE IP address (that is, target UE network address) in operation 1.1 and operation 1.2, and the (E)AS1 Relocation Indication is (E)AS1 relocation indication information used for indicating that the (E)AS1 is to be migrated; the source DNAI and the target DNAI are newly added parameters, indicating that the (E)AS1 is migrated from the source DNAI to the target DNAI, and if the same value is given to the source DNAI and the target DNAI, it indicates that the DNAIs are actually unchanged; and a traffic filter includes at least a first AS network address (IP address) IPas1 corresponding to the (E)AS1, a target port number PORTas1 (a first port number of the first AS) corresponding to the (E)AS1, and a transmission layer protocol (for example, UDP/TCP (Transmission Control Protocol)), and additionally, may further include the IP address of the target UE, that is, IPue, and target N6 traffic routing information, that is, target traffic routing information.

Continuing to refer to FIG. 6, the target N6 traffic routing information may include a DNAI (which refers to a target DNAI herein); and NAT information, that is, NAT, where NAT includes NAT (between (IPue, IPas1, (o (abbreviation of option, that is, optional) PORTas1) and (IPue, IPas2, (o) PORTas2)), IPas2 represents a second AS network address (IP address) corresponding to the (E)AS2, and PORTas2 represents a second port number of the second AS.

The Nnef_TrafficInfluenceCreate/Update Request message may include one or more pieces of N6 traffic routing information, and in the embodiment in FIG. 6, N6 traffic routing information of only the innovative used NAT method proposed in this embodiment of the present disclosure is listed. This NAT is to translate an IP flow (uplink packet) having a source address being IPue and a target address being IPas1 into an IP flow having a source address being IPue and a target address being IPas2; and translate an IP flow (downlink packet) having a source address being IPas2 and a target address being IPue into an IP flow having a source address being IPas1 and a target address being IPue. Optionally, when a port parameter is included, the NAT is to translate an IP flow (uplink packet) having a source address being IPue, a target address being IPas1, and a target port number being PORTas1 into an IP flow having a source address being IPue, a target address being IPas2, and a target port number being PORTas2; and translate an IP flow (downlink packet) having a source address being IPas2, a target address being IPue, and a source port number being PORTas2 into an IP flow having a source address being IPas1, a target address being IPue, and a source port number being PORTas1.

In a case that the AF decides to transmit the Nnef_TrafficInfluenceCreate/Update Request message the target NEF, the AF may query internal configuration information according to IPue in the Nnef_TrafficInfluenceCreate/Update Request message, to obtain a target NEF ID (not defined in the standards), and then transmit the Nnef_TrafficInfluenceCreate/Update Request message to the target NEF corresponding to this target NEF ID.

In operation 1.5, the target NEF transmits an Npcf_PolicyAuthorization_Create/Update Request message (that is, policy authorization request message) to the target PCF according to the foregoing parameters provided by the AF. In a case that the AF transmits the Nnef_TrafficInfluenceCreate Request message in operation 1.4, the target NEF transmits the Npcf_PolicyAuthorization_Create Request message in operation 1.5. In a case that the AF transmits the Nnef_TrafficInfluenceUpdate Request message in operation 1.4, the target NEF transmits the Npcf_PolicyAuthorization_Update Request message in operation 1.5.

The target NEF may obtain the SUPI, the DNN, and the S-NSSAI through mapping according to the foregoing parameters provided by the AF. The IPue, the source DNAI, the target DNAI, the traffic filter, and the target N6 traffic routing information in the Npcf_PolicyAuthorization_Create/Update Request message directly come from parameters of the Nnef_TrafficInfluenceCreate/Update Request message in operation 1.4.

In a case that the AF/target NEF transmits the Npcf_PolicyAuthorization_Create/Update Request message to the target PCF, the AF/target NEF queries the BSF according to IPue in the Npcf_PolicyAuthorization_Create/Update Request message, to obtain the ID of the target PCF, and then transmits the Npcf_PolicyAuthorization_Create/Update Request message to a PCF corresponding to the target PCF.

In operation 1.6, the target PCF transmits an Npcf_SMPolicyControl UpdateNotify message (that is, SM policy control update notification message, where the full name of SM is session management) to the SMF, which includes some parameters provided in operation 1.4/1.5: the IPue, the source DNAI, the target DNAI, the traffic filter, and the target N6 traffic routing information.

In operation 1.7, the SMF receives the Npcf_SMPolicyControl UpdateNotify message provided by the target PCF, and determines that the target DNAI and the source DNAI therein are consistent. Therefore, the SMF decides not to change the PSA, that is, not to perform the UL CL insertion operation. Moreover, the SMF determines according to the target N6 traffic routing information provided by the target PCF that an NAT operation needs to be performed, and therefore transmits an N4 session command to the UPF/PSA1. In operation 1.1, the SMF has transmitted an N4 Session Establishment Request message to the UPF/PSA1, and the UPF/PSA1 has returned an N4 Session Establishment Response message to the SMF. Therefore, in operation 1.7, the SMF may transmit an N4 Session Modification Request message to the UPF/PSA1, and the N4 session modification request message carries a packet processing rule.

After receiving the N4 Session Modification Request message, the UPF/PSA1 returns an N4 Session Modification Response message to the SMF, to acknowledge that the N4 Session Modification Request message has been received.

The UPF/PSA1 may translate, according to the packet processing rule, a detected IP flow (uplink packet) having a source address being IPue and a target address being IPas1 into an IP flow having a source address being IPue and a target address being IPas2; and a detected IP flow (downlink packet) having a source address being IPas2 and a target address being IPue into an IP flow having a source address being IPas1 and a target address being IPue. Optionally, when a port parameter is included, the UPF/PSA1 may translate a detected IP flow (uplink packet) having a source address being IPue, a target address being IPas1, and a target port number being PORTas1 into an IP flow having a source address being IPue, a target address being IPas2, and a target port number being PORTas2; and translate a detected IP flow (downlink packet) having a source address being IPas2, a target address being IPue, and a source port number being PORTas2 into an IP flow having a source address being IPas1, a target address being IPue, and a source port number being PORTas1.

In operation 1.8, the SMF returns an Npcf_SMPolicyControl UpdateNotify Response message to the target PCF according to the received N4 Session Modification Response message transmitted by the UPF/PSA1.

In operation 1.9, the target PCF returns an Npcf_PolicyAuthorization_Create/Update Response message to the target NEF according to the received Npcf_SMPolicyControl UpdateNotify Response message transmitted by the SMF.

In operation 1.10, the target NEF returns an Nnef_TrafficInfluenceCreate/Update Response message to the AF according to the received Npcf_PolicyAuthorization_Create/Update Response message transmitted by the target PCF.

In operation 1.11, the AF receives the Nnef_TrafficInfluenceCreate/Update Response message from the target NEF, where in a case that the message is a positive reply, the (E)AS1 is migrated to the (E)AS2.

In operation 1.12, the target UE transmits an uplink packet such as an uplink IP packet to the UPF/PSA1 through the target PDU Session established in operation 1.1, where in a case that the UPF/PSA1 detects, according to the packet processing rule delivered by the SMF in the foregoing operation 1.7, that the received uplink IP packet has a source address being IPue, a target address being IPas1, a source port number being PORTue (a port number of the target UE), a target port number being PORTas1 (in a case that the packet processing rule further includes a first port number and a second port number), and a transmission layer protocol being, for example, the UDP/TCP, operation 1.13 is performed.

In operation 1.13, the UPF/PSA1 replaces, according to the packet processing rule delivered by the SMF in the foregoing operation 1.7, the target address IPas1 of the received uplink IP packet with IPas2, and the target port number PORTas1 with PORTas2 (in a case that PORT translation needs to be performed in the packet processing rule, cases in the following embodiments are similar to this case).

In operation 1.14, the UPF/PSA1 transmits the uplink IP packet (having the source address IPue, the target address IPas2, the source port number PORTue, the target port number PORTas2, and the transmission layer protocol (for example, the UDP/TCP)) subjected to NAT translation to the (E)AS2.

In operation 1.15, the (E)AS2 receives the uplink IP packet, and replies with a downlink IP packet (having a source address IPas2, a target address IPue, a source port number PORTas2, a target port number PORTue, and a transmission layer protocol (for example, the UDP/TCP)) to the UPF/PSA1.

In operation 1.16, if detecting that the downlink IP packet (having the source address IPas2, the target address IPue, the source port number PORTas2, and the transmission layer protocol (for example, the UDP/TCP)) matches the packet processing rule, the UPF/PSA1 replaces, according to the packet processing rule delivered by the SMF in operation 1.7, the target address IPas2 of the received downlink IP packet with IPas1 and the source port number PORTas2 with PORTas1 (in a case that PORT translation needs to be performed in the packet processing rule, cases in the following embodiments are similar to this case).

In operation 1.17, the UPF/PSA1 transmits the downlink IP packet (having the source address IPas1, the target address IPue, the source port number PORTas1, the target port number PORTue, and the transmission layer protocol (for example, the UDP/TCP)) subjected to NAT translation to the target UE through the established target PDU Session.

In a case that an uplink packet subsequently received by the UPF/PSA1 still matches the foregoing packet processing rule, the uplink packet continues to be processed according to the foregoing operations 1.13 and 1.14. In a case that a downlink packet subsequently received by the UPF/PSA1 still matches the foregoing packet processing rule, the downlink packet continues to be processed according to the foregoing operations 1.16 and 1.17. In a case that the packet processing rule includes the PORT item, PORT translation needs to be performed.

Figure 7:
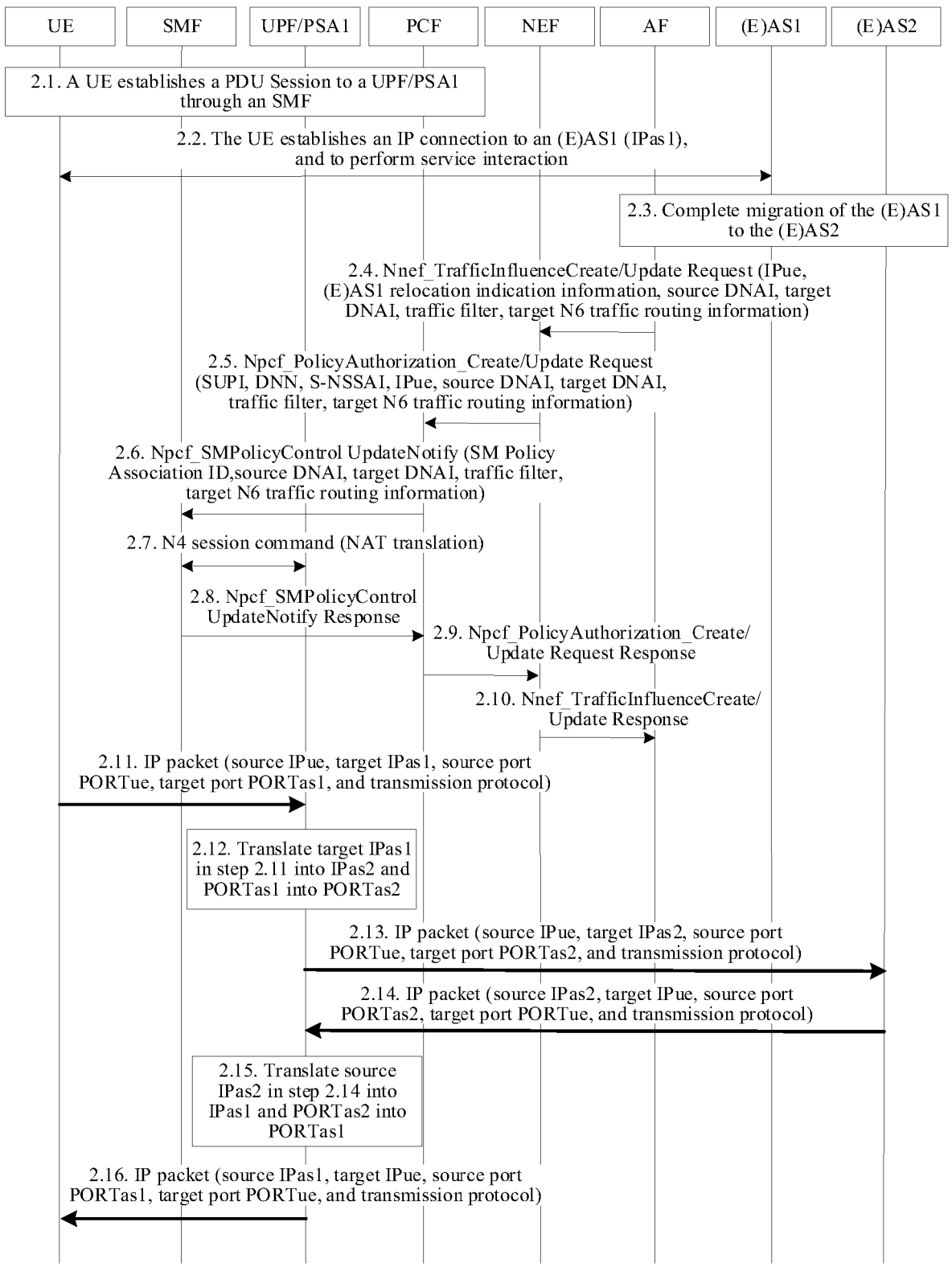
FIG. 7 is a schematic flowchart of a method for implementing service continuity according to an embodiment.

FIG. 7 is a flowchart of a method for implementing service continuity according to an embodiment. Operations 2.1 and 2.2 in the embodiment in FIG. 7 are similar to operations 1.1 and 1.2 in the embodiment in FIG. 6. The embodiment in FIG. 7 differs from the embodiment in FIG. 6 in that, in operation 2.3, migration from the (E)AS1 to the (E)AS2 is performed, and therefore operation 1.11 in the embodiment in FIG. 6 is not performed. Operations 2.4 to 2.10 in the embodiment in FIG. 7 are similar to operations 1.4 to 1.10 in the embodiment in FIG. 6. Operations 2.11 to 2.16 in the embodiment in FIG. 7 are similar to operations 1.12 to 1.17 in the embodiment in FIG. 6.

The following embodiments may alternatively include two similar situations after and before completing migration from the (E)AS1 to the (E)AS2.

Figure 8:
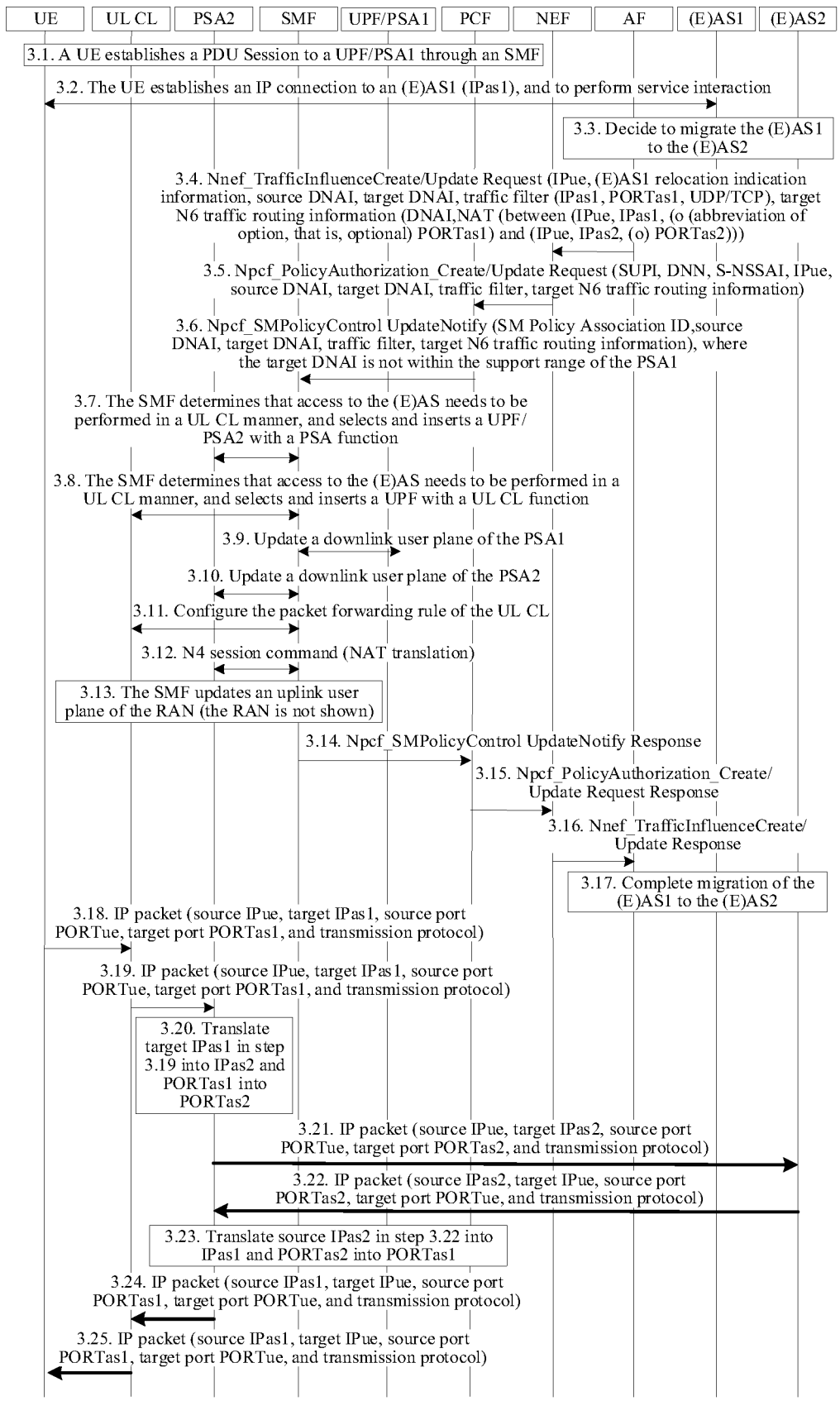
FIG. 8 is a flowchart of a method for implementing service continuity according to an embodiment.

FIG. 8 is a flowchart of a method for implementing service continuity according to an embodiment. The embodiment in FIG. 8 is (E)AS Relocation in a case that the DNAI is changed, and it is determined that the UPF/PSA2 (a second PSA UPF network element) performs NAT translation.

Operations 3.1 to 3.6 in the embodiment in FIG. 8 are similar to operations 1.1 to 1.6 in the embodiment in FIG. 6, but the target DNAI in the message transmitted by the AF is different from the source DNAI. Different from the embodiment in FIG. 6, the embodiment in FIG. 8 further includes the following operations.

In operation 3.7, in a case that the DNAI (target DNAI) in the target N6 traffic routing information (DNAI, NAT (between (IPue, IPas1, (o)PORTas1) and (IPue, IPas2, (o)PORTas2)) in the message received by the SMF from the target PCF does not match the DNAI (source DNAI) currently supported by the UPF/PSA1 of the SMF, the SMF determines and selects a UPF/PSA2 and a UPF/UL CL (UP CL UPF network element) matching the DNAI (target DNAI) provided by the AF, and the SMF transmits a message to the selected UPF/PSA2. For a detailed interaction process between the SMF and the PSA2, reference is made to step 2 in chapter 4.3.5.4 (Addition of additional PSA and BP or UL CL) of TS23.502.

In operation 3.8, the SMF determines and selects a UPF/UL CL. For a detailed interaction process between the SMF and the UPF/UL CL, reference is made to step 3 in chapter 4.3.5.4 of TS23.502.

In operation 3.9, the SMF transmits a message to the UPF/PSA1, to cause a downlink user plane of the UPF/PSA1 to be switched from a radio AN (RAN) to the UPF/UL CL. For a detailed interaction process, reference is made to step 4 in chapter 4.3.5.4 of TS23.502.

In operation 3.10, the SMF transmits a message to the UPF/PSA2, to cause a downlink user plane of the UPF/PSA2 to be the UPF/UL CL. For a detailed interaction process, reference is made to step 5 in chapter 4.3.5.4 of TS23.502.

In operation 3.11, the SMF generates, according to the target N6 traffic routing information (DNAI, NAT (between (IPue, IPas1, (o)PORTas1) and (IPue, IPas2, (o)PORTas2) received in operation 3.7, a packet forwarding rule to be transmitted to the UPF/UL CL, and according to the packet forwarding rule, the UPF/UL CL may forward a received uplink packet having a source address being IPue, a target address being IPas1, and optionally a target port number being PORTas1 to the UPF/PSA2.

Operation 3.11 may alternatively be performed in operation 3.8, that is, when it is the first time that the SMF transmits a message to the UPF/UL CL, an N4 Session Establishment Request message is transmitted, the packet forwarding rule may be included in the N4 Session Establishment Request message and transmitted to the UPF/UL CL, and the UPF/UL CL replies to the SMF with an N4 Session Establishment Response message, to acknowledge that the N4 Session Establishment Request message is received. If it is not the first time that the SMF transmits a message to the UPF/UL CL, an N4 Session Modification Request message is transmitted by the SMF, the packet forwarding rule may be included in the N4 Session Modification Request message and transmitted to the UPF/UL CL, and the UPF/UL CL replies to the SMF with an N4 Session Modification Response message, to acknowledge that the N4 Session Modification Request message is received.

The foregoing N4 Session Establishment Request message or N4 Session Modification Request message including the packet forwarding rule and transmitted by the SMF to the UL CL is referred to as a first N4 session request message.

In operation 3.12, the SMF generates, according to the target N6 traffic routing information (DNAI, NAT (between (IPue, IPas1, (o)PORTas1) and (IPue, IPas2, (o)PORTas2) received in operation 3.7, an NAT rule transmitted to the UPF/PSA2, to enable the UPF/PSA2 to perform an NAT operation.

Operation 3.12 may alternatively be performed in operation 3.10, that is, when it is the first time that the SMF transmits a message to the UPF/PSA2, an N4 Session Establishment Request message is transmitted, the NAT rule may be included in the N4 Session Establishment Request message and transmitted to the UPF/PSA2, and the UPF/PSA2 replies to the SMF with an N4 Session Establishment Response message, to acknowledge that the N4 Session Establishment Request message is received. If it is not the first time that the SMF transmits a message to the UPF/PSA2, an N4 Session Modification Request message is transmitted by the SMF, the NAT rule may be included in the N4 Session Modification Request message and transmitted to the UPF/PSA2, and the UPF/PSA2 replies to the SMF with an N4 Session Modification Response message, to acknowledge that the N4 Session Modification Request message is received.

The foregoing N4 Session Establishment Request message or N4 Session Modification Request message including the NAT rule and transmitted by the SMF to the UPF/PSA2 is referred to as a second N4 session request message.

In operation 3.13, the SMF transmits a message to the RAN, to cause an uplink user plane of the RAN to be updated to the UPF/UL CL. For a detailed interaction process, reference is made to step 6 in chapter 4.3.5.4 of TS23.502.

Operations 3.14 to 3.17 in the embodiment in FIG. 8 are similar to operations 1.8 to 1.11 in the embodiment in FIG. 6.

In operation 3.18, the target UE transmits an uplink packet such as an uplink IP packet (source address IPue, target address IPas1, source port number PORTue, target port number PORTas1, and transmission layer protocol (for example, the UDP/TCP)) to the UPF/UL CL.

In operation 3.19, if detecting according to the packet forwarding rule delivered by the SMF in operation 3.11 that the uplink IP packet has a source address being IPue, a target address being IPas1, and a target port number being PORTas1 (if the packet forwarding rule further includes a PORT related parameter), the UPF/UL CL forwards an uplink IP packet matching the packet forwarding rule to the UPF/PSA2; otherwise, forwards an uplink IP packet not matching the packet forwarding rule to the UPF/PSA1.

Operations 3.20 to 3.25 in the embodiment in FIG. 8 are similar to operations 1.13 to 1.17 in the embodiment in FIG. 6, but in the embodiment in FIG. 8, the UPF/PSA2 performs matching in the packet processing rule and NAT translation, and the downlink packet is transmitted by the UPF/PSA2 to the UPF/UL CL, and then transmitted to the target UE.

It may be understood that, in the embodiment in FIG. 8, the UPF/UL CL needs to perform matching and steering operations on the uplink packet; and does not perform any matching operation on the downlink packet, but the downlink packet is directly transmitted to the RAN, and then to the target UE.

In a case that an uplink packet subsequently received by the UPF/PSA2 still matches the foregoing packet processing rule, the uplink packet continues to be processed according to the foregoing operations 3.20 and 3.21. In a case that a downlink packet subsequently received by the UPF/PSA2 still matches the foregoing packet processing rule, the downlink packet continues to be processed according to the foregoing operations 3.22 and 3.23. In a case that the packet processing rule includes the PORT item, PORT translation needs to be performed.

Figure 9:
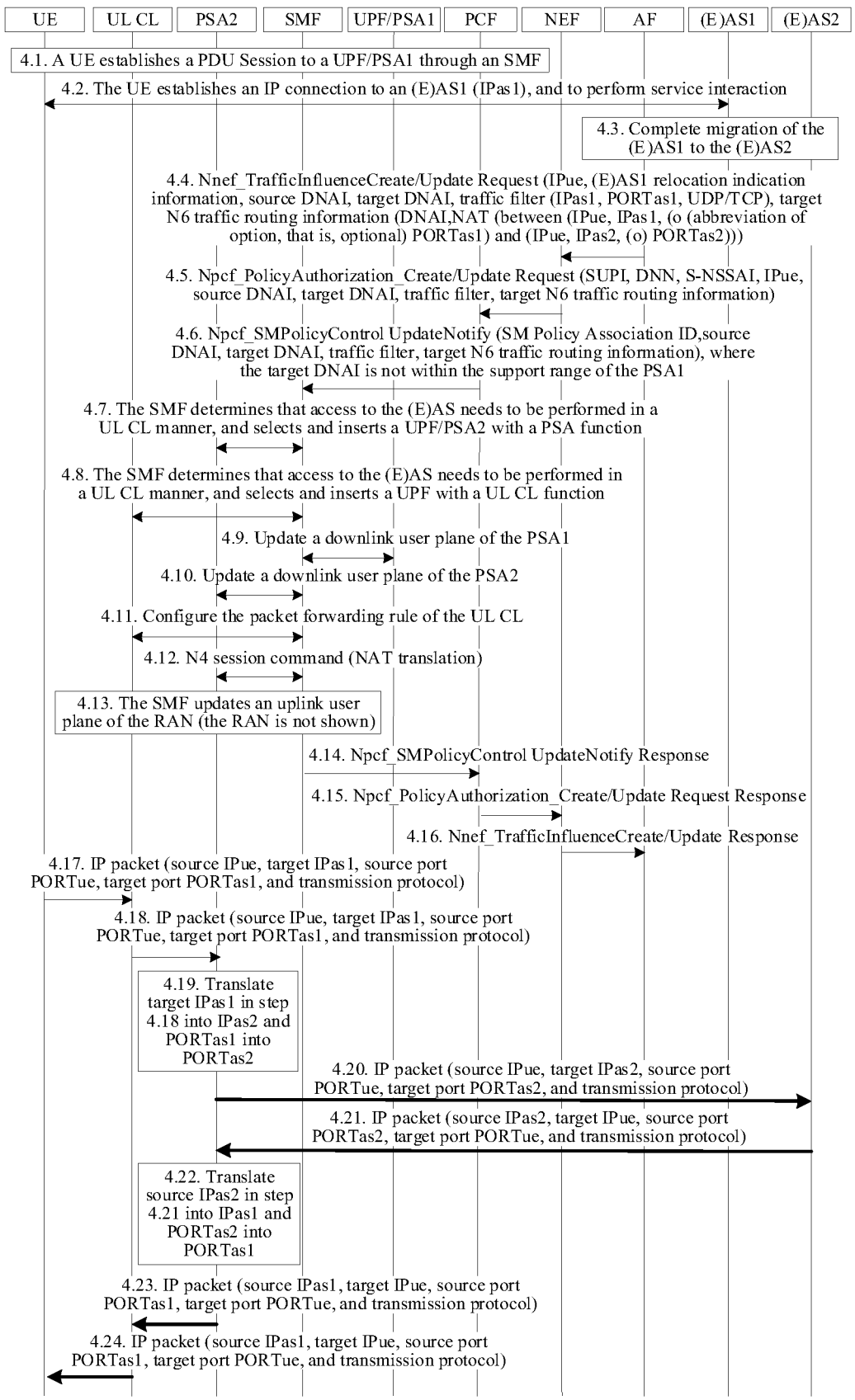
FIG. 9 is a flowchart of a method for implementing service continuity according to an embodiment.

FIG. 9 is a flowchart of a method for implementing service continuity according to an embodiment of the present disclosure. The embodiment in FIG. 9 and the embodiment in FIG. 8 are similar but different in that, in operation 4.3, migration from the (E)AS1 to the (E)AS2 is performed, and therefore operation 3.17 in the embodiment in FIG. 8 is not performed.

Operations 4.1 and 4.2 in the embodiment in FIG. 9 are similar to operations 3.1 and 3.2 in the embodiment in FIG. 8. Operations 4.4 and 4.16 in the embodiment in FIG. 9 are similar to operations 3.4 and 3.16 in the embodiment in FIG. 8. Operations 4.17 and 4.24 in the embodiment in FIG. 9 are similar to operations 3.18 and 3.25 in the embodiment in FIG. 8.

Figure 10:
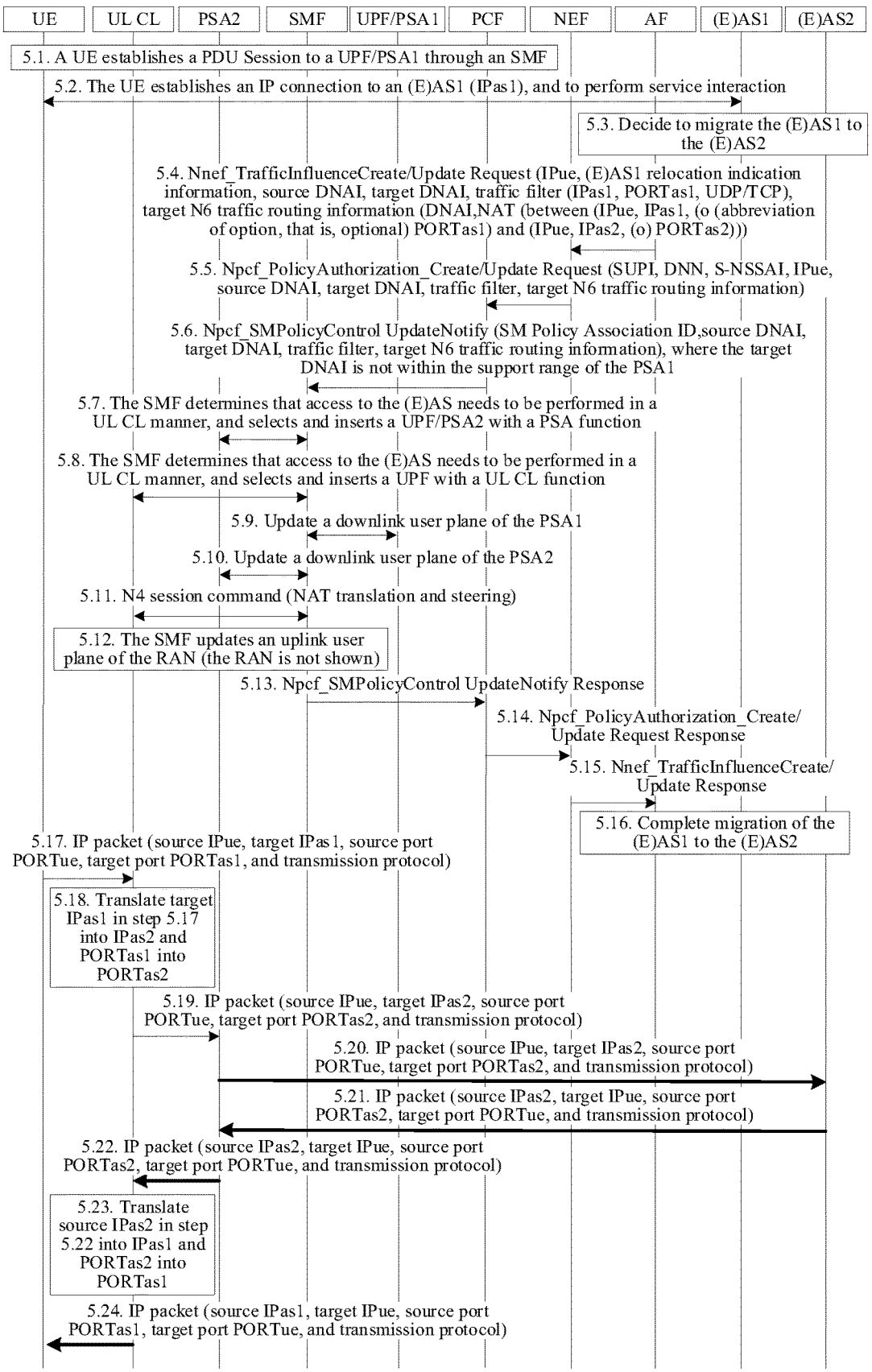
FIG. 10 is a flowchart of a method for implementing service continuity according to an embodiment.

FIG. 10 is a flowchart of a method for implementing service continuity according to an embodiment. The embodiment in FIG. 10 and the embodiment in FIG. 8 are similar but different in that in the embodiment in FIG. 10, the UPF/UL CL instead of the UPF/PSA2 performs NAT translation.

The UPF/UL CL in the embodiment in FIG. 8 performs only matching and steering in the packet processing rule, and the UPF/PSA2 performs NAT translation. In the embodiment in FIG. 10, NAT translation in the embodiment in FIG. 8 is changed from being performed by the UPF/PSA2 to being performed by the UPF/UL CL. Therefore, the UPF/UL CL in the embodiment in FIG. 10 has a traffic steering function after NAT translation, while the UPF/PSA2 does not have any special function, and has functions similar to those in related standards.

Operations 5.1 to 5.10 in the embodiment in FIG. 10 are similar to operations 3.1 to 3.10 in the embodiment in FIG. 8, but the target DNAI in the message transmitted by the AF is different from the source DNAI. Operations 3.11 and 3.12 in the embodiment in FIG. 8 are not performed.

In operation 5.11, the SMF generates, according to the target N6 traffic routing information (DNAI, NAT (between (IPue, IPas1, (o)PORTas1) and (IPue, IPas2, (o)PORTas2) received in operation 5.6, a packet processing rule to be delivered to the UPF/UL CL, to enable the UPF/UL CL to perform an NAT operation and transmit the translated uplink packet to the UPF/PSA2.

Operation 5.11 may alternatively be performed in operation 5.8, that is, when it is the first time that the SMF transmits a message to the UPF/UL CL, an N4 Session Establishment Request message is transmitted, the packet processing rule may be included in the N4 Session Establishment Request message and transmitted to the UPF/UL CL, and the UPF/UL CL replies to the SMF with an N4 Session Establishment Response message, to acknowledge that the N4 Session Establishment Request message is received. If it is not the first time that the SMF transmits a message to the UPF/UL CL, an N4 Session Modification Request message is transmitted by the SMF, the packet processing rule may be included in the N4 Session Modification Request message and transmitted to the UPF/UL CL, and the UPF/UL CL replies to the SMF with an N4 Session Modification Response message, to acknowledge that the N4 Session Modification Request message is received.

The foregoing N4 Session Establishment Request message or N4 Session Modification Request message including the packet processing rule and transmitted by the SMF to the UL CL is referred to as a target N4 session request message.

Operations 5.12 and 5.17 in the embodiment in FIG. 10 are the same as operations 3.13 and 3.18 in the embodiment in FIG. 8.

In operation 5.18, if detecting according to the packet processing rule delivered by the SMF in operation 5.11 that the received uplink packet has a source address being IPue, a target address being IPas1, and a target port number being PORTas (if the packet processing rule further includes PORTas), the UPF/UL CL performs NAT translation on an uplink packet matching the packet processing rule (referring to operation 1.13 in the embodiment in FIG. 6).

In operation 5.19, the UPF/UL CL forwards the translated uplink packet to the UPF/PSA2. The UPF/UL CL forwards an uplink packet not matching the packet processing rule to the UPF/PSA1.

In operation 5.20, the UPF/PSA2 transmits the uplink packet to the (E)AS2.

In operation 5.21, the (E)AS2 replies with a downlink packet (having a source address IPas2, a target address IPue, a source port number PORTas2, a target port number POR-Tue, and a transmission layer protocol (for example, the UDP/TCP)) to the UPF/PSA2.

In operation 5.22, the UPF/PSA2 transmits the downlink packet to the UPF/UL CL.

In operation 5.23, if detecting according to the packet processing rule delivered by the SMF in operation 5.11 that the downlink IP packet has the source address being IPas2, the target address being IPue, the source port number being PORTas2, and the transmission layer protocol being, for example, the UDP/TCP, the UPF/UL CL replaces the target address IPas2 of the downlink packet matching the packet processing rule with IPas1, replaces the source port number PORTas2 with PORTas1 (in a case that PORT translation needs to be performed in the packet processing rule), and then transmits the translated downlink packet to the target UE.

In the embodiment in FIG. 10, the UPF/UL CL needs to perform matching, NAT translation, and steering operations on the uplink and downlink packets.

In a case that an uplink packet subsequently received by the UPF/UL CL still matches the foregoing packet processing rule, the uplink packet continues to be processed according to the foregoing operations 5.18 and 5.19. In a case that a downlink packet subsequently received by the UPF/UL CL still matches the foregoing packet processing rule, the downlink packet continues to be processed according to the foregoing operations 5.22 and 5.23. In a case that the packet processing rule includes the PORT item, PORT translation needs to be performed.

Figure 11:
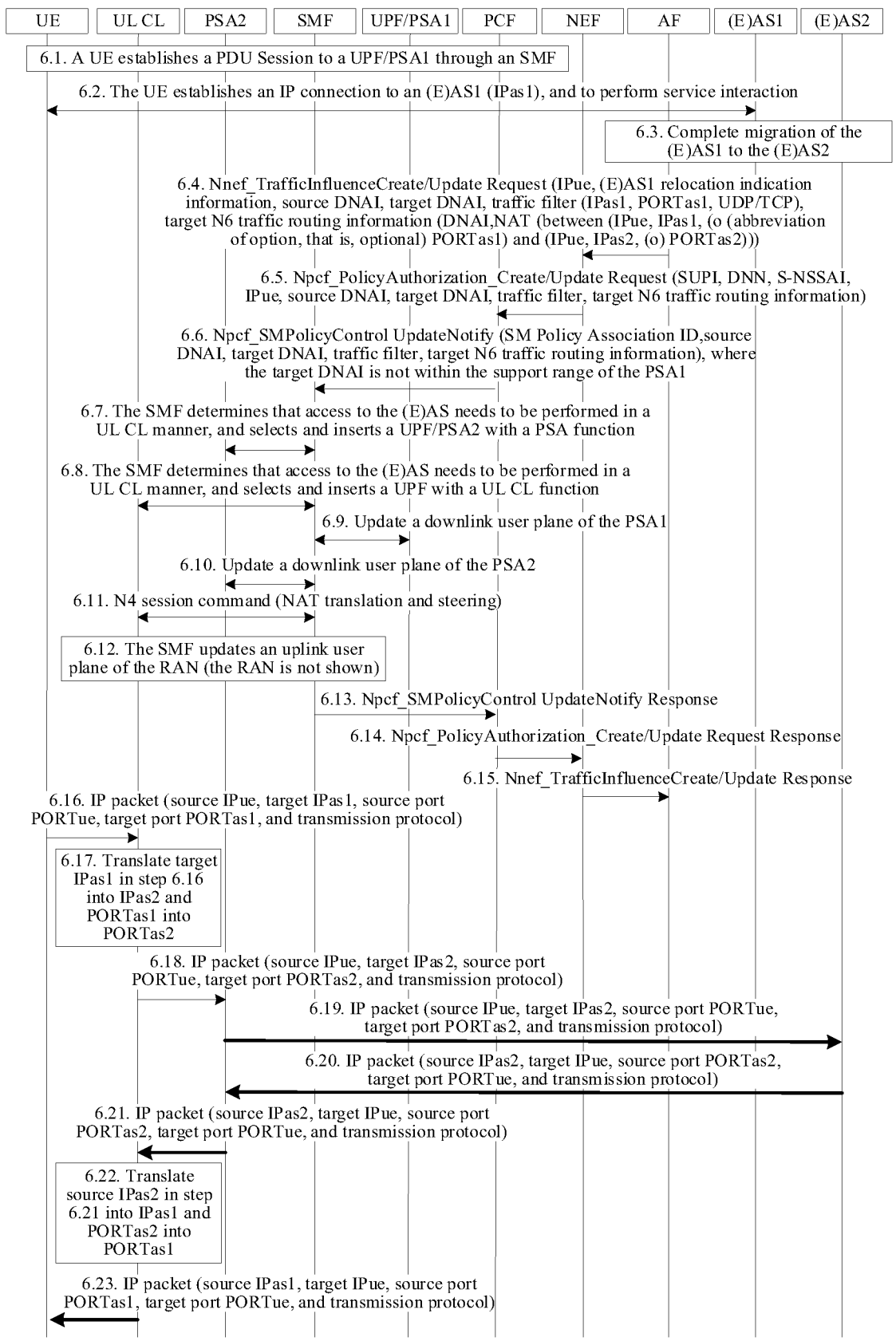
FIG. 11 is a flowchart of a method for implementing service continuity according to an embodiment.

FIG. 11 is a flowchart of a method for implementing service continuity according to an embodiment. The embodiment in FIG. 11 and the embodiment in FIG. 10 are similar but different in that, in step 6.3, migration from the (E)AS1 to the (E)AS2 is performed, and therefore step 5.16 in the embodiment in FIG. 10 is not performed.

Operations 6.1 and 6.2 in the embodiment in FIG. 11 are similar to operations 5.1 and 5.2 in the embodiment in FIG. 10. Operations 6.4 to 6.15 in the embodiment in FIG. 11 are similar to operations 5.4 to 5.16 in the embodiment in FIG. 10. Operations 6.16 to 6.23 in the embodiment in FIG. 11 are similar to operations 5.17 to 5.24 in the embodiment in FIG. 10.

The method for implementing service continuity provided in this embodiment of the present disclosure is initiated by the AF, and may keep service continuity when the address of the (E)AS is changed in a case that the DNAI is changed and not changed. The method may be used for implementing EC communication, and the EC communication has a significant application value, and may be widely applied to services such as game acceleration, video acceleration, and vehicle to everything (V2X). The NAT technical solution provided in this embodiment of the present disclosure is simple and feasible, and is easy in deployment. In the technical solution provided in this embodiment of the present disclosure, based on a technical solution in related standards, only an innovative solution is added, so that the system is not modified greatly, and it is easy to perform standardized and large-scale deployment.

Figure 12:
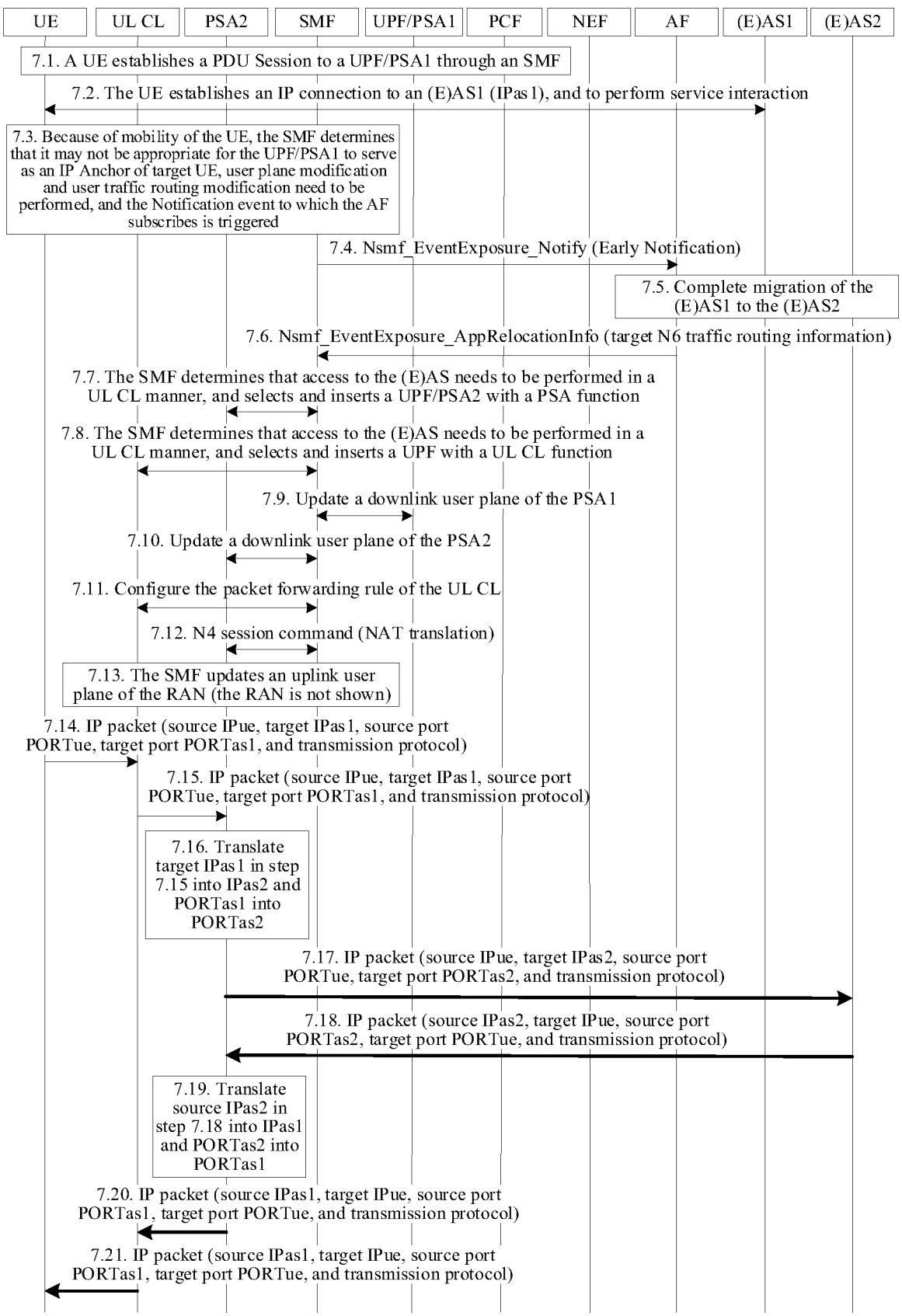
FIG. 12 is a flowchart of a method for implementing service continuity according to an embodiment.

FIG. 12 is a flowchart of a method for implementing service continuity according to an embodiment of Early notification is used in the embodiment in FIG. 12, (E)AS Relocation is performed in a case that the DNAI is changed, and it is determined that the UPF/PSA2 performs NAT translation.

Operations 7.1 and 7.2 in the embodiment in FIG. 12 are similar to operations 1.1 and 1.2 in the embodiment in FIG. 6, and in the embodiment in FIG. 12, the AF subscribes to some events from the SMF. The event to which the AF subscribes from the SMF is "UP_PATH_CH". The AF may directly subscribe from the SMF, or the AF may first subscribe from the target NEF and then the target NEF subscribes from the SMF, where the event "UP_PATH_CH" that is subscribed to may be "EARLY", "LATE", or "EARLY_LATE". In a case that "UP_PATH_CH" to which the AF subscribes from the SMF is "EARLY" or "EARLY_LATE", it indicates that the AF transmits an early event subscription message to the SMF.

In operation 7.3, because of mobility of the target UE, the SMF determines according to a location of the target UE that a distance between the target UE and the UPF/PSA1 is relatively long, it is not appropriate anymore for the UPF/PSA1 as an IP Anchor of the target UE to communicate with the external (E)AS1, and PSA UPF network element modification and user traffic routing modification need to be performed. In this case, the Notification event to which the AF subscribes from the SMF is triggered.

In operation 7.4, when the SMF decides to perform PSA UPF network element modification (a UPF/PSA2 and a UPF/UL CL are added, and the DNAI is changed), and if the Notification event to which the AF subscribes from the SMF is "EARLY" or "EARLY_LATE", the SMF initiates a notification process, and the SMF may transmit an Nsmf_EventExposure_Notify (Early Notification) message, that is, early event notification message) to the AF directly or to the AF through the target NEF to report the Notification event. The SMF adds the target DNAI corresponding to the UPF/PSA2 and the source DNAI corresponding to the UPF/PSA1 to this parameter EventNotification, where DnaiChangeType is EARLY, and the event type is "UP_PATH_CH".

In operation 7.5, the AF triggers migration of the (E)AS1 to the target DNAI to serve as the (E)AS2.

In operation 7.6, the AF replies to the SMF with an Nsmf_EventExposure_AppRelocationInfo message (that is, an event exposure application relocation information message) indicating successful migration of the (E)AS1, where this message includes target N6 traffic routing information, and this target N6 traffic routing information includes parameters the same as those in the target N6 traffic routing information in the foregoing embodiments.

In the embodiment in FIG. 12, the SMF determines that the UPF/PSA2 performs an NAT translation operation, and for operations 7.7 to 7.21, reference may be made to operations 4.7 to 4.24 in the embodiment in FIG. 9.

Figure 13:
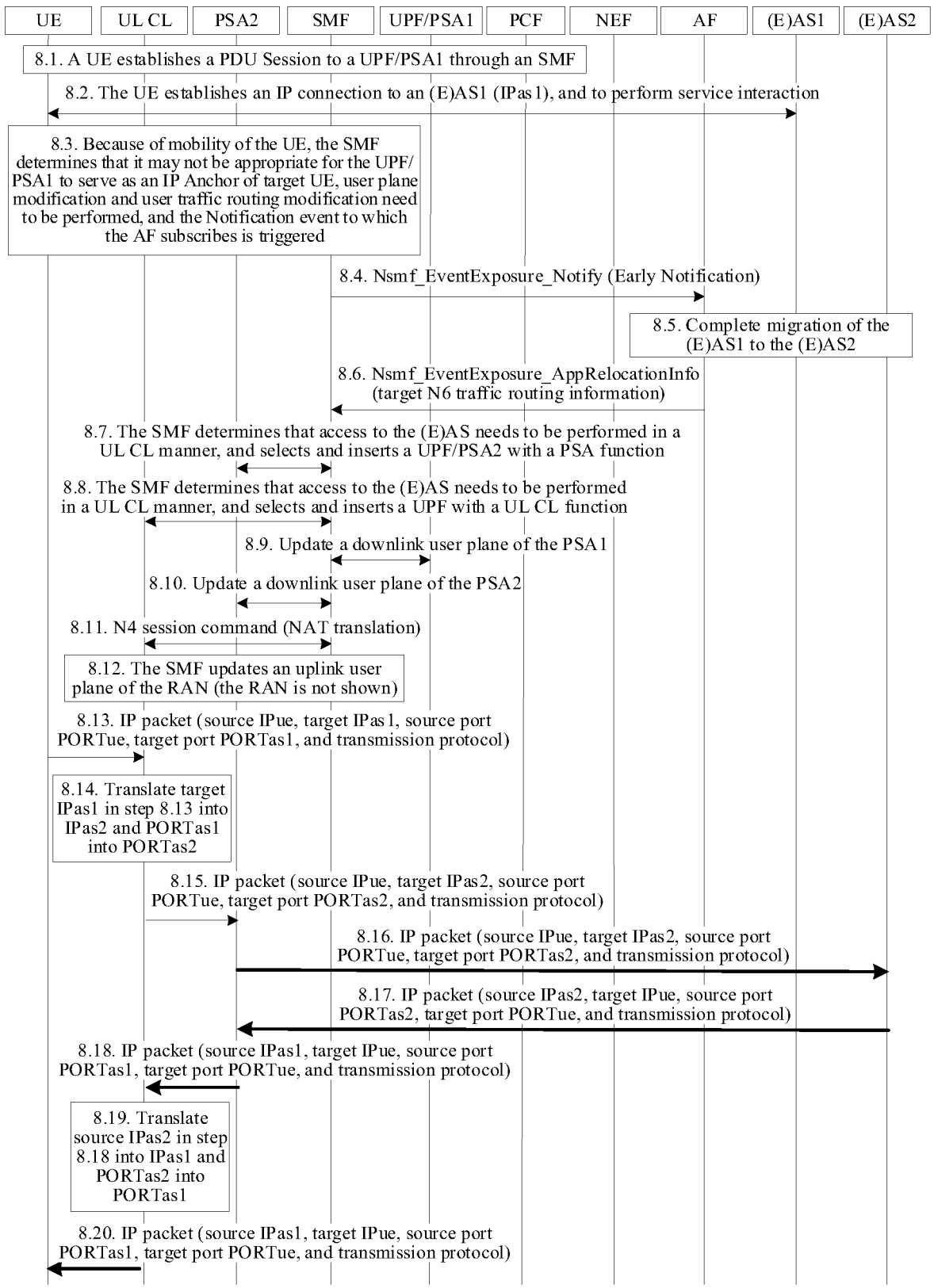
FIG. 13 is a flowchart of a method for implementing service continuity according to an embodiment.

FIG. 13 is a flowchart of a method for implementing service continuity according to an embodiment. Early notification is used in the embodiment in FIG. 13, (E)AS Relocation is performed in a case that the DNAI is changed, and it is determined that the UPF/UL CL performs NAT translation.

Operations 8.1 to 8.6 in the embodiment in FIG. 13 are the same as operations 7.1 to 7.6 in the embodiment in FIG. 12.

In the embodiment in FIG. 13, the SMF determines that the UPF/UL CL performs an NAT translation operation, and for operations 8.7 to 8.20, reference may be made to operations 6.7 to 6.23 in the embodiment in FIG. 11.

Figure 14:
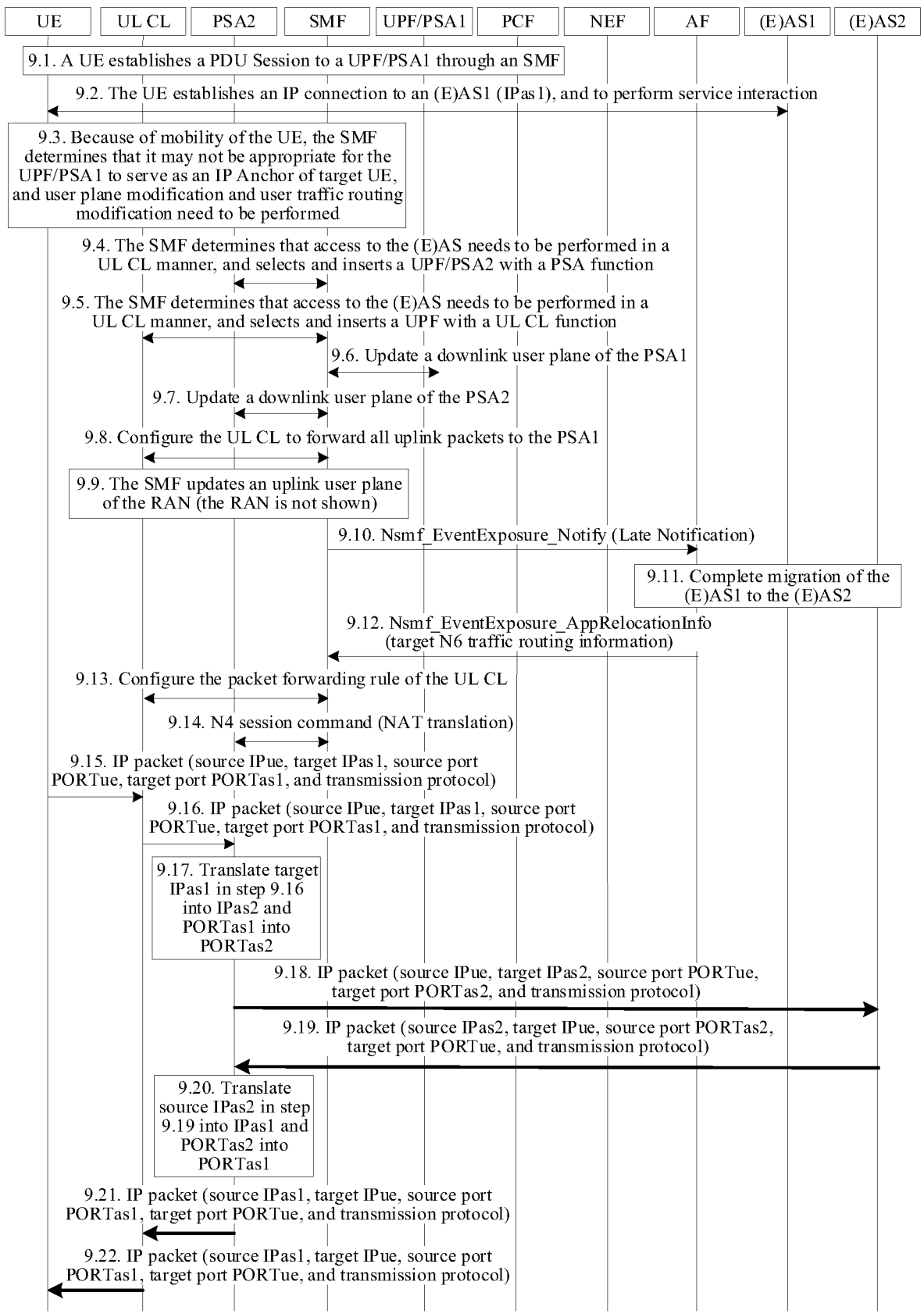
FIG. 14 is a flowchart of a method for implementing service continuity according to an embodiment.

FIG. 14 is a flowchart of a method for implementing service continuity according to an embodiment. Late notification is used in the embodiment in FIG. 14, (E)AS Relocation is performed in a case that the DNAI is changed, and it is determined that the UPF/PSA2 performs NAT translation.

Operations 9.1 and 9.2 in the embodiment in FIG. 14 and operations 7.1 and 7.2 in the embodiment in FIG. 12 are similar but different in that, in the embodiment in FIG. 14, the event "UP_PATH_CH" to which the AF subscribes from the SMF is "LATE" or "EARLY_LATE", and it indicates that the AF transmits a late event subscription message to the SMF.

Operation 9.3 in the embodiment in FIG. 14 is the same as operation 7.3 in the embodiment in FIG. 12.

Operations 9.4 and 9.7 in the embodiment in FIG. 14 are the same as operations 7.7 and 7.10 in the embodiment in FIG. 12.

In operation 9.8, SMF configures the UPF/UL CL to still route all uplink packets of the target UE to the UPF/PSA1, where because migration of the (E)AS1 to the (E)AS2 has not been completed in this case, any uplink packet cannot be routed to the UPF/PSA2.

Operation 9.9 in the embodiment in FIG. 14 is the same as operation 7.13 in the embodiment in FIG. 12.

In operation 9.10, the SMF initiates a notification process, and the SMF may transmit an Nsmf_EventExposure_Notify (Late notification) message, that is, late event notification message) to the AF directly or to the AF through the target NEF to report the Notification event. The SMF adds the target DNAI corresponding to the UPF/PSA2 and the source DNAI corresponding to the UPF/PSA1 to this parameter EventNotification, where DnaiChangeType is LATE, and the event type is "UP_PATH_CH".

In operation 9.11, the AF triggers migration of the (E)AS1 to the target DNAI to serve as the (E)AS2.

In operation 9.12, the AF replies to the SMF with an Nsmf_EventExposure_AppRelocationInfo message (that is, an event exposure application relocation information message) indicating successful migration of the (E)AS1, where this message includes target N6 traffic routing information, and this target N6 traffic routing information includes parameters the same as those in the target N6 traffic routing information in the foregoing embodiments.

In the embodiment in FIG. 14, the SMF determines that the UPF/PSA2 performs an NAT translation operation, and for operations 9.13 to 9.22, reference may be made to operations 7.11 and 7.12 and operations 7.14 to 7.21 in the embodiment in FIG. 12.

Figure 15:
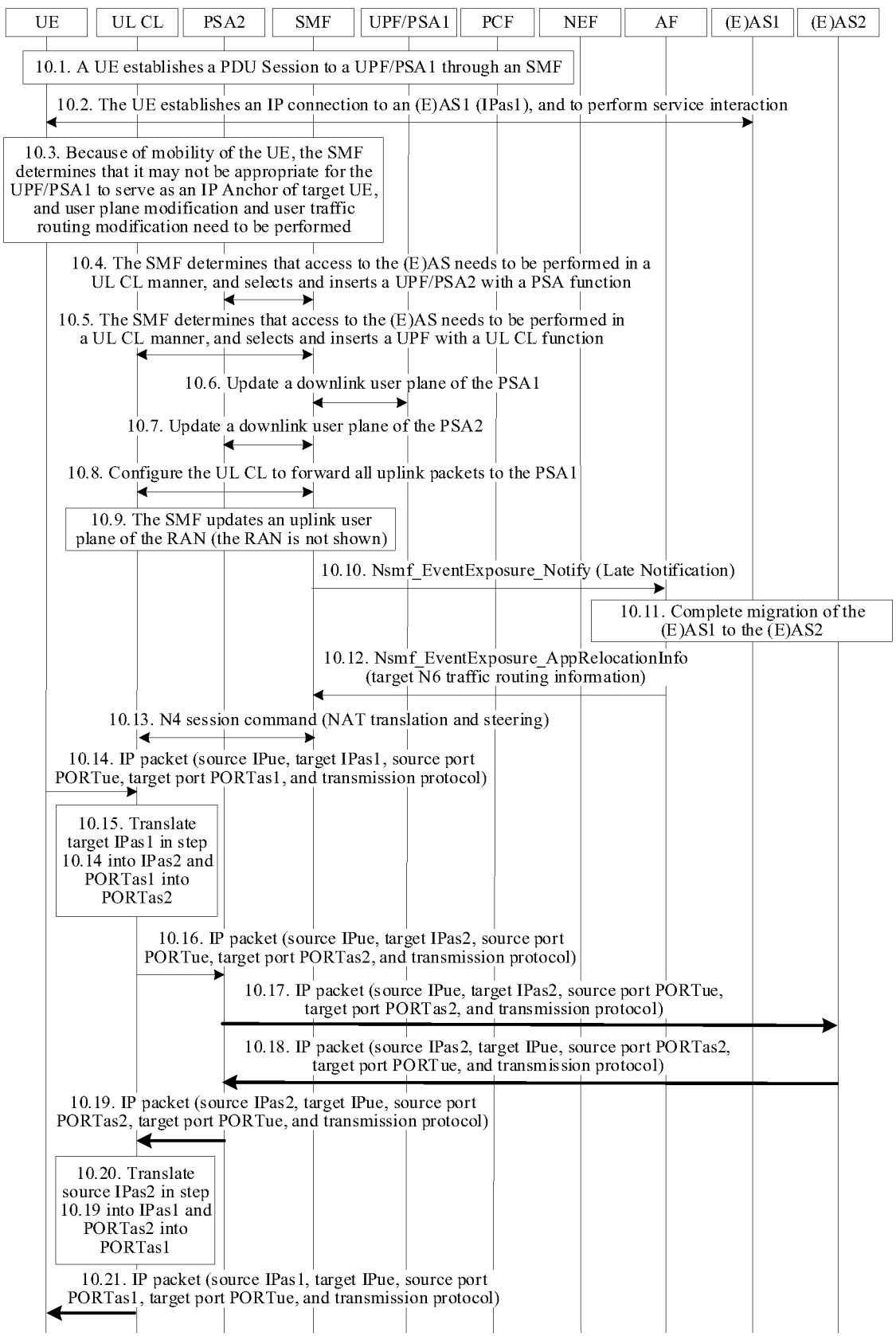
FIG. 15 is a flowchart of a method for implementing service continuity according to an embodiment.

FIG. 15 is a flowchart of a method for implementing service continuity according to an embodiment. Late Notification is used in the embodiment in FIG. 15, (E)AS Relocation is performed in a case that the DNAI is changed, and it is determined that the UPF/UL CL performs NAT translation.

Operations 10.1 to 10.12 in the embodiment in FIG. 15 are the same as operations 9.1 and 9.12 in the embodiment in FIG. 14.

Operation 10.13 in the embodiment in FIG. 15 is the same as operation 8.11 in the embodiment in FIG. 13.

Operations 10.14 to 10.21 in the embodiment in FIG. 15 are the same as operations 8.13 and 8.20 in the embodiment in FIG. 13.

In the method for implementing service continuity provided in this embodiment of the present disclosure, when the change in the location of the UE causes a current route of the UE between the UPF/PSA1 and the (E)AS1 to be not appropriate, the SMF may trigger the Early Notification and Late Notification processes, to instruct the (E)AS to perform migration between different DNAIs, and keep service continuity when the address of the (E)AS is changed. The method may be used for implementing EC communication, and the EC communication has a significant application value, and may be widely applied to services such as game acceleration, video acceleration, and vehicle to everything (V2X). The NAT technical solution provided in this embodiment of the present disclosure is simple and feasible, and is easy in deployment. In the technical solution provided in this embodiment of the present disclosure, based on a technical solution in related standards, only an innovative solution is added, so that the system is not modified greatly, and it is easy to perform standardized and large-scale deployment.

Figure 16:
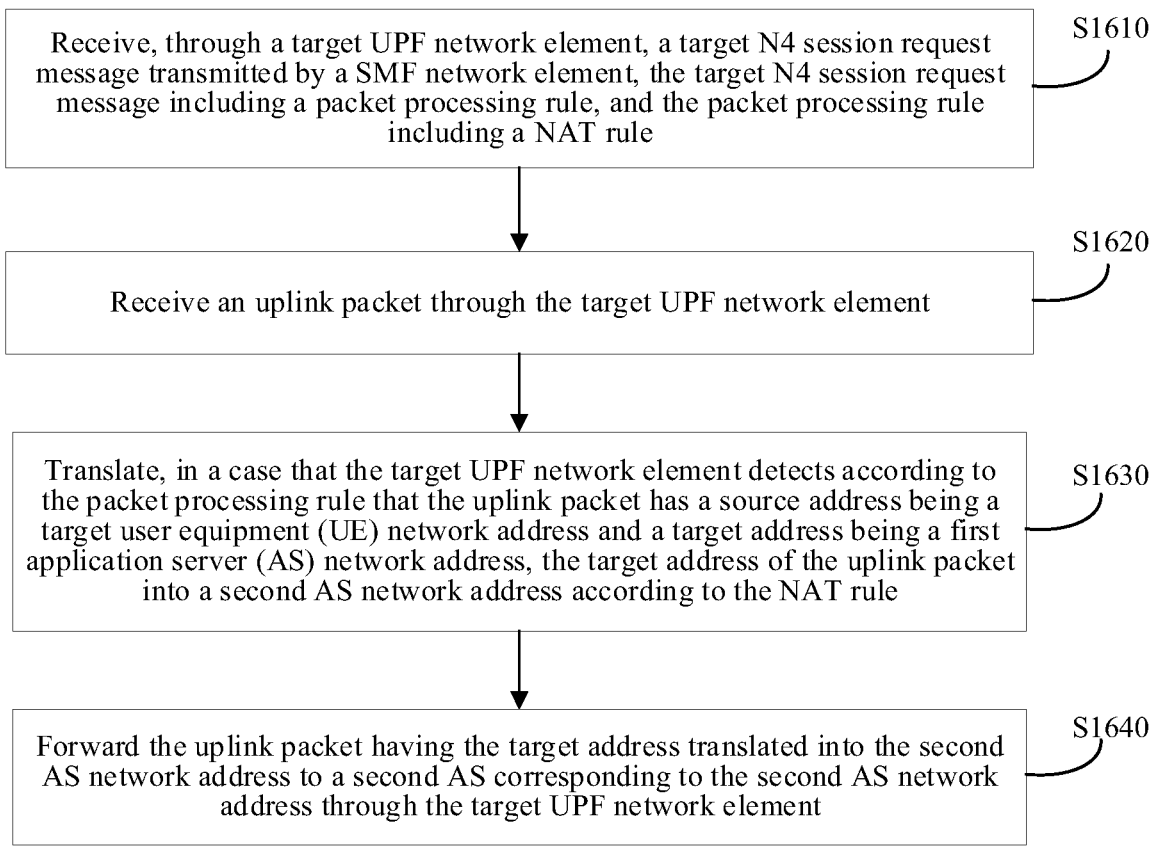
FIG. 16 is a flowchart of a method for implementing service continuity according to an embodiment.

FIG. 16 is a flowchart of a method for implementing service continuity according to an embodiment. As shown in FIG. 16, the method provided in this embodiment of the present disclosure may be performed by a UPF network element such as a UE, and include the following steps:

In operation S1610, the system receives, through a target UPF network element, a target N4 session request message transmitted by a SMF network element, the target N4 session request message including a packet processing rule, and the packet processing rule including an NAT rule.

In operation S1620, the system receives an uplink packet through the target UPF network element.

In operation S1630, the system translates, in a case that the target UPF network element detects according to the packet processing rule that the uplink packet has a source address being a target UE network address and a target address being a first AS network address, the target address of the uplink packet into a second AS network address according to the NAT rule.

In an exemplary embodiment, in a case that the target UPF network element further detects according to the packet processing rule that a target port number of the uplink packet is a first port number of a first AS corresponding to the first AS network address, the method may further include: translating the target port number of the uplink packet into a second port number of the second AS according to the NAT rule.

In operation S1640, the system forwards the uplink packet having the target address translated into the second AS network address to a second AS corresponding to the second AS network address through the target UPF network element.

In an exemplary embodiment, the method may further include receiving a downlink packet through the target UPF network element, translating, in a case that the target UPF network element detects according to the packet processing rule that the downlink packet has a source address being the second AS network address and a target address being the target UE network address, the source address of the downlink packet into the first AS network address according to the NAT rule, and forwarding the downlink packet having the source address translated into the first AS network address to a target UE corresponding to the target UE network address through the target UPF network element.

In an exemplary embodiment, in a case that the target UPF network element further detects according to the packet processing rule that a source port number of the downlink packet is a second port number of the second AS, the method may further include translating the source port number of the downlink packet into a first port number of a first AS corresponding to the first AS network address according to the NAT rule.

In an exemplary embodiment, the target UPF network element may include a first PSA UPF network element.

In an exemplary embodiment, the target UPF network element may include an UP CL UPF network element and a second PSA UPF network element, the packet processing rule further includes a packet forwarding rule, and the target N4 session request message includes a first N4 session request message and a second N4 session request message. The receiving, through a target UPF network element, a target N4 session request message transmitted by a SMF network element may include receiving the first N4 session request message through the UP CL UPF network element, where the first N4 session request message includes the packet forwarding rule, and receiving the second N4 session request message through the second PSA UPF network element, where the second N4 session request message includes the NAT rule.

In an exemplary embodiment, the receiving an uplink packet through the target UPF network element may include receiving the uplink packet through the UP CL UPF network element. The translating the target address of the uplink packet into a second AS network address according to the NAT rule may include forwarding, by the UP CL UPF network element, the uplink packet matching the packet forwarding rule to the second PSA UPF network element, and translating, by the second PSA UPF network element according to the NAT rule, the target address of the detected uplink packet received from the UP CL UPF network element from the first AS network address into the second AS network address. The forwarding the uplink packet having the target address translated into the second AS network address to a second AS corresponding to the second AS network address through the target UPF network element may include forwarding the uplink packet having the target address translated into the second AS network address to the second AS through the second PSA UPF network element.

In an exemplary embodiment, the method may further include translating, by the second PSA UPF network element according to the NAT rule, a target port number of the detected uplink packet received from the UP CL UPF network element from a first port number of a first AS corresponding to the first AS NAT to a second port number of the second AS.

In an exemplary embodiment, the method may further include receiving a downlink packet through the second PSA UPF network element, translating, in a case that the second PSA UPF network element detects that the downlink packet has a source address being the second AS network address and a target address being the target UE network address, the source address of the downlink packet into the first AS network address according to the NAT rule, forwarding, by the second PSA UPF network element, the downlink packet having the source address translated into the first AS network address to the UP CL UPF network element, and forwarding, by the UP CL UPF network element, the downlink packet having the source address translated into the first AS network address to the target UE.

In an exemplary embodiment, in a case that the second PSA UPF network element further detects that a source port number of the downlink packet is a second port number of the second AS, the method further may include translating the source port number of the downlink packet into a first port number of a first AS corresponding to the first AS network address according to the NAT rule.

In an exemplary embodiment, the target UPF network element may include an UP CL UPF network element.

In an exemplary embodiment, before the target N4 session request message is received, the method may further include establishing a target PDU session with a target UE corresponding to the target UE network address, to cause the target UE to communicate with a first AS corresponding to the first AS network address.

For specific implementation of the method for implementing service continuity provided in this embodiment of the present disclosure, reference may be made to the content of the method for implementing service continuity in the foregoing other embodiments, and details are not described herein again.

Figure 17:
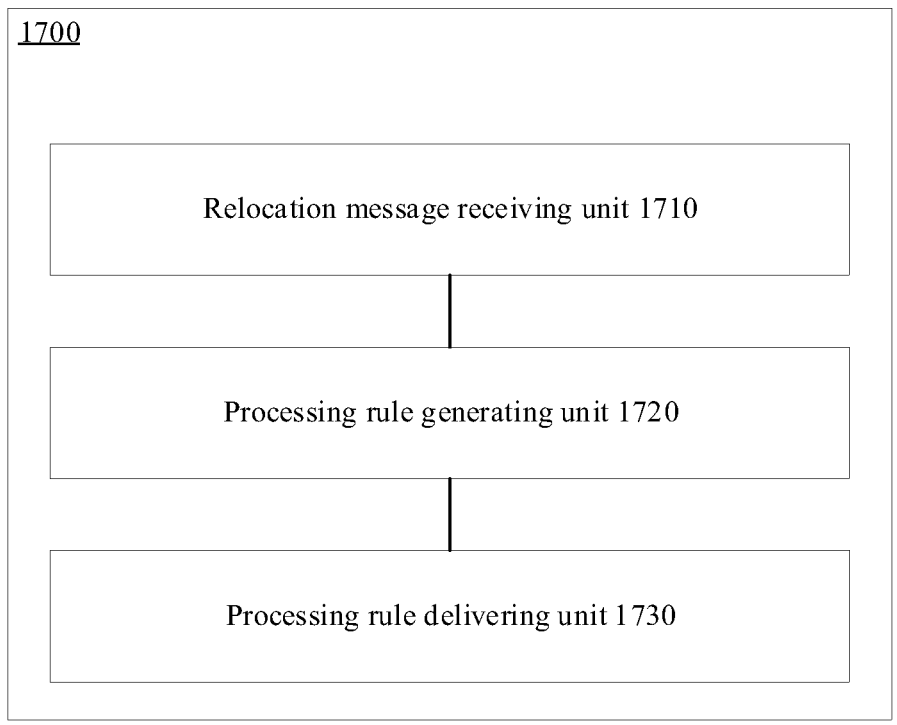
FIG. 17 is a diagram of an apparatus for implementing service continuity according to an embodiment.

FIG. 17 is a diagram of an apparatus for implementing service continuity according to an embodiment. As shown in FIG. 17, the apparatus 1700 for implementing service continuity provided in this embodiment of the present disclosure may include a relocation message receiving unit 1710, a processing rule generating unit 1720, and a processing rule delivering unit 1730.

The relocation message receiving unit 1710 may be configured to receive a target relocation message, the target relocation message carrying target traffic routing information, the target traffic routing information including a target DNAI and NAT information, the NAT information including a target UE network address, a first AS network address, and a second AS network address, a target UE corresponding to the target UE network address having established a target PDU session to a first PSA UPF network element and communicating with a first AS corresponding to the first AS network address.

The processing rule generating unit 1720 may be configured to generate a packet processing rule according to the target traffic routing information, the packet processing rule including an NAT rule, the NAT rule including translating a target address of an uplink packet transmitted by the target UE from the first AS network address into the second AS network address and translating a source address of a received downlink packet whose target address is the target UE network address from the second AS network address into the first AS network address.

The processing rule delivering unit 1730 may be configured to deliver the packet processing rule to a target network device, to cause the target network device to forward, according to the packet processing rule, the uplink packet transmitted by the target UE to a second AS corresponding to the second AS network address and the received downlink packet whose target address is the target UE network address and whose source address is the second AS network address to the target UE.

In an exemplary embodiment, the target relocation message may include an SM policy control update notification message. The relocation message receiving unit 1710 may include a SM policy control update notification message receiving unit, which may be configured to receive the SM policy control update notification message from a target PCF network element, where the SM policy control update notification message includes a source DNAI corresponding to the first PSA UPF network element, the target DNAI, and the target traffic routing information.

In an exemplary embodiment, the SM policy control update notification message may be generated by the target PCF network element according to a policy authorization request message received from a target NEF network element, and the policy authorization request message may include the target UE network address, the source DNAI, the target DNAI, and the target traffic routing information. The policy authorization request message may be generated by the target NEF network element according to an influence on traffic routing request message received from an AF network element, and the influence on traffic routing request message may include the target UE network address, the source DNAI, the target DNAI, and the target traffic routing information.

In an exemplary embodiment, the SM policy control update notification message may be generated by the target PCF network element according to an influence on traffic routing request message received from an AF network element, and the influence on traffic routing request message may include the target UE network address, the source DNAI, the target DNAI, and the target traffic routing information.

In an exemplary embodiment, in a case that the target DNAI matches the source DNAI, the target network device may include the first PSA UPF network element. The processing rule delivering unit 1730 may include an N4 session modification request message transmitting unit, which may be configured to transmit an N4 session modification request message to the first PSA UPF network element, where the N4 session modification request message includes the packet processing rule.

In an exemplary embodiment, the apparatus 1700 for implementing service continuity may further include an N4 session modification response message receiving unit, which may be configured to receive an N4 session modification response message with which the first PSA UPF network element replies, and a SM policy control update notification response message returning unit, which may be configured to return an SM policy control update notification response message to the target PCF network element, to cause the target PCF network element to return an influence on traffic routing response message to an AF network element, where after receiving the influence on traffic routing response message, the AF network element triggers to complete migration of the first AS to the second AS.

In an exemplary embodiment, before the target relocation message is received, the first AS has been migrated to the second AS through an AF network element.

In an exemplary embodiment, in a case that the target traffic routing information may further include a first port number of the first AS and a second port number of the second AS, the NAT rule may further include translating a target port number of the uplink packet from the first port number into the second port number and translating a source port number of the downlink packet from the second port number into the first port number.

In an exemplary embodiment, in a case that the target DNAI does not match a source DNAI supported by the first PSA UPF network element, the target network device may include a second PSA UPF network element and an UP CL UPF network element, the packet processing rule may further include a packet forwarding rule, and the packet forwarding rule may include forwarding the received uplink packet whose source address is the target UE network address and whose target address is the first AS network address to the second PSA UPF network element. The processing rule delivering unit 1730 may include a packet forwarding rule delivering unit, which may be configured to deliver the packet forwarding rule to the UP CL UPF network element, and an NAT rule delivering unit, which may be configured to deliver the NAT rule to the second PSA UPF network element.

In an exemplary embodiment, the apparatus 1700 for implementing service continuity may further include a user plane path change unit, which may be configured to, before the packet processing rule is delivered to the target network device, determine the second PSA UPF network element, determine the UP CL UPF network element, update a downlink user plane of the first PSA UPF network element, and update a downlink user plane of the second PSA UPF network element.

In an exemplary embodiment, in a case that the target DNAI does not match a source DNAI supported by the first PSA UPF network element, the target network device may include an UP CL UPF network element. The processing rule delivering unit 1730 may include an UP CL receiving packet processing rule unit, which may be configured to deliver the packet processing rule to the UP CL UPF network element.

In an exemplary embodiment, the target relocation message may include an event exposure application relocation information message. The relocation message receiving unit 1710 may include an event exposure application relocation information message receiving unit, which may be configured to receive the event exposure application relocation information message from an AF network element, where the event exposure application relocation information message includes the target traffic routing information.

In an exemplary embodiment, the apparatus 1700 for implementing service continuity may further include an early event notification unit, which may be configured to, before the target relocation message is received, receive an early event subscription message of the AF network element, decide to perform PSA UPF network element modification, and transmit an early event notification message to the AF network element according to the decision, where the early event notification message includes an event notification parameter, and the event notification parameter includes a source DNAI corresponding to the first PSA UPF network element and the target DNAI corresponding to a second PSA UPF network element.

In an exemplary embodiment, the apparatus 1700 for implementing service continuity may further include a first AS migration unit, which may be configured to trigger, by the AF network element according to the early event notification message, migration of the first AS from the source DNAI to the target DNAI, to serve as the second AS.

In an exemplary embodiment, the packet processing rule may further include a packet forwarding rule. The apparatus 1700 for implementing service continuity may further include a second uplink UPF network element determining unit, which may be configured to determine the second PSA UPF network element and an UP CL UPF network element after the target relocation message is received, and a first target network device determining unit, which may be configured to use the second PSA UPF network element and the UP CL UPF network element as the target network device. The processing rule delivering unit 1730 may include a packet forwarding rule sending unit, which may be configured to deliver the packet forwarding rule to the UP CL UPF network element, and an NAT rule sending unit, which may be configured to deliver the NAT rule to the second PSA UPF network element.

In an exemplary embodiment, the apparatus 1700 for implementing service continuity may further include a UPF network element addition unit, which may be configured to determine the second PSA UPF network element and an UP CL UPF network element after the target relocation message is received, and a second target network device determining unit, which may be configured to use the UP CL UPF network element as the target network device. The processing rule delivering unit 1730 may include a packet processing rule sending unit, which may be configured to deliver the packet processing rule to the UP CL UPF network element.

In an exemplary embodiment, the apparatus 1700 for implementing service continuity may further include a late event notification unit, which may be configured to, before the target relocation message is received, receive a late event subscription message of the AF network element, decide to perform PSA UPF network element modification, determine the second PSA UPF network element and an UP CL UPF network element according to the decision, configure the UP CL UPF network element to forward the received uplink packet to the first PSA UPF network element, and transmit a late event notification message to the AF network element, where the late event notification message includes an event notification parameter, and the event notification parameter includes a source DNAI corresponding to the first PSA UPF network element and the target DNAI corresponding to the second PSA UPF network element.

In an exemplary embodiment, the apparatus 1700 for implementing service continuity may further include a second AS migration unit, which may be configured to trigger, by the AF network element according to the late event notification message, migration of the first AS from the source DNAI to the target DNAI, to serve as the second AS.

In an exemplary embodiment, the packet processing rule may further include a packet forwarding rule. The apparatus 1700 for implementing service continuity may further include a third target network device determining unit, which may be configured to use the second PSA UPF network element and the UP CL UPF network element as the target network device after the target relocation message is received. The processing rule delivering unit 1730 may include a packet forwarding rule transmission unit, which may be configured to deliver the packet forwarding rule to the UP CL UPF network element, and an NAT rule transmission unit, which may be configured to deliver the NAT rule to the second PSA UPF network element.

In an exemplary embodiment, the apparatus 1700 for implementing service continuity may further include a fourth target network device determining unit, which may be configured to use the UP CL UPF network element as the target network device after the target relocation message is received. The processing rule delivering unit 1730 may include a packet detecting rule delivering unit, which may be configured to deliver the packet processing rule to the UP CL UPF network element.

For specific implementation of the units of the apparatus for implementing service continuity provided in this embodiment of the present disclosure, reference may be made to the content of the foregoing method for implementing service continuity, and details are not described herein again.

Figure 18:
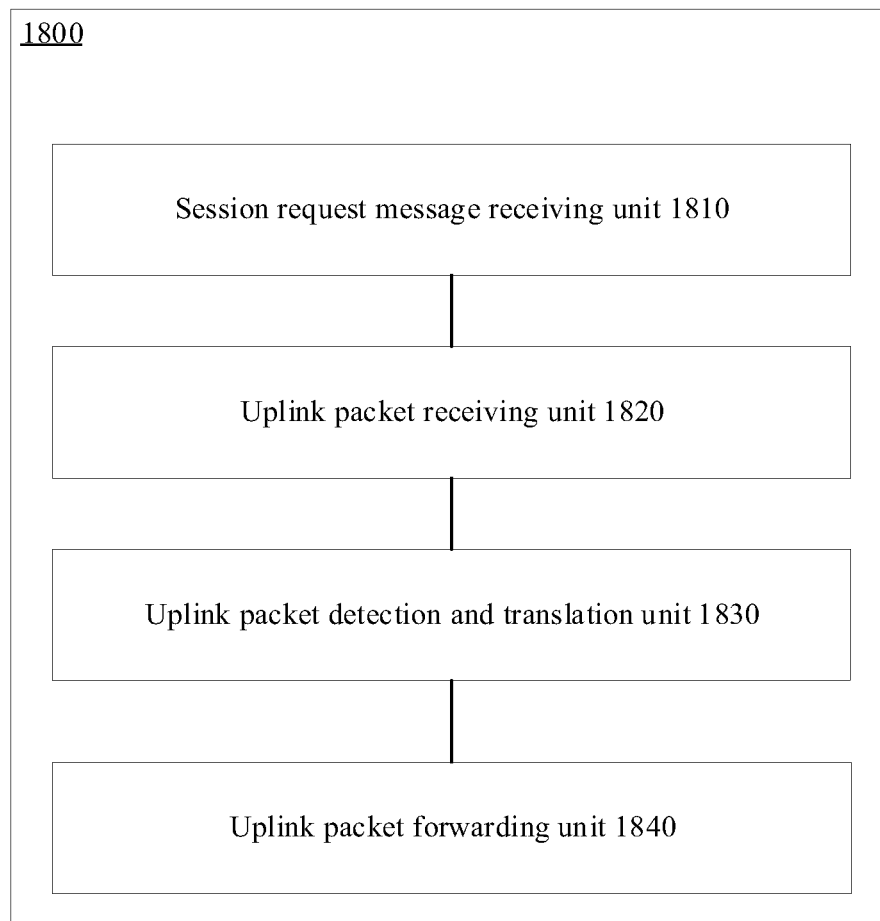
FIG. 18 is a diagram of a user plane function (UPF) network element according to an embodiment.

FIG. 18 is a diagram of a UPF network element according to an embodiment. As shown in FIG. 18, the UPF network element 1800 provided in this embodiment of the present disclosure may include a session request message receiving unit 1810, an uplink packet receiving unit 1820, an uplink packet detection and translation unit 1830, and an uplink packet forwarding unit 1840.

The session request message receiving unit 1810 may be configured to receive a target N4 session request message transmitted by a SMF network element, the target N4 session request message including a packet processing rule, and the packet processing rule including an NAT rule. The uplink packet receiving unit 1820 may be configured to receive an uplink packet. The uplink packet detection and translation unit 1830 may be configured to translate, in a case that the target UPF network element detects according to the packet processing rule that the uplink packet has a source address being a target UE network address and a target address being a first AS network address, the target address of the uplink packet into a second AS network address according to the NAT rule. The uplink packet forwarding unit 1840 may be configured to forward the uplink packet having the target address translated into the second AS network address to a second AS corresponding to the second AS network address through the target UPF network element.

In an exemplary embodiment, the uplink packet detection and translation unit 1830 may include a first target port number translation unit, which may be configured to translate, in a case that the target UPF network element detects according to the packet processing rule that the uplink packet has a source address being a target UE network address, a target address being a first AS network address, and a target port number being a first port number of a first AS corresponding to the first AS network address, the target address of the uplink packet into a second AS network address and the target port number into a second port number of the second AS according to the NAT rule.

In an exemplary embodiment, the UPF network element 1800 may further include a first downlink packet receiving unit, which may be configured to receive a downlink packet, a first source address translation unit, which may be configured to translate, in a case of detecting according to the packet processing rule that the downlink packet has a source address being the second AS network address and a target address being the target UE network address, the source address of the downlink packet into the first AS network address according to the NAT rule, and a first downlink packet forwarding unit, which may be configured to forward the downlink packet having the source address translated into the first AS network address to a target UE corresponding to the target UE network address.

In an exemplary embodiment, the first source address translation unit may include a first source port number translation unit, which may be configured to translate, in a case of detecting according to the packet processing rule that the downlink packet has a source address being the second AS network address, a target address being the target UE network address, and a source port number being a second port number of the second AS, the source address of the downlink packet into the first AS network address and the source port number into a first port number of a first AS corresponding to the first AS network address according to the NAT rule.

In an exemplary embodiment, the UPF network element may include a first PSA UPF network element.

In an exemplary embodiment, the UPF network element may include an UP CL UPF network element and a second PSA UPF network element, the packet processing rule may further include a packet forwarding rule, and the target N4 session request message may include a first N4 session request message and a second N4 session request message. The session request message receiving unit 1810 may include a first N4 session request message receiving unit, which may be configured to receive the first N4 session request message through the UP CL UPF network element, where the first N4 session request message includes the packet forwarding rule, and a second N4 session request message receiving unit, which may be configured to receive the second N4 session request message through the second PSA UPF network element, where the second N4 session request message includes the NAT rule.

In an exemplary embodiment, the uplink packet receiving unit 1820 may include an uplink packet obtaining unit, which may be configured to receive the uplink packet through the UP CL UPF network element. The uplink packet detection and translation unit 1830 may include an uplink packet transmitting unit, which may be configured to forward, by the UP CL UPF network element, the uplink packet matching the packet forwarding rule to the second PSA UPF network element, and a target address translation unit, which may be configured to translate, by the second PSA UPF network element according to the NAT rule, the target address of the detected uplink packet received from the UP CL UPF network element from the first AS network address into the second AS network address. The uplink packet forwarding unit 1840 may include an uplink packet transmission unit, which may be configured to forward the uplink packet having the target address translated into the second AS network address to the second AS through the second PSA UPF network element.

In an exemplary embodiment, the target address translation unit may include a second target port number translation unit, which may be configured to translate, by the second PSA UPF network element according to the NAT rule, the target address of the detected uplink packet received from the UP CL UPF network element from the first AS network address into the second AS network address and the target port number from a first port number of a first AS corresponding to the first AS network address into a second port number of the second AS.

In an exemplary embodiment, the UPF network element 1800 may further include a second downlink packet receiving unit, which may be configured to receive a downlink packet through the second PSA UPF network element, a second source address translation unit, which may be configured to translate, in a case that the second PSA UPF network element detects that the downlink packet has a source address being the second AS network address and a target address being the target UE network address, the source address of the downlink packet into the first AS network address according to the NAT rule, a second downlink packet forwarding unit, which may be configured to forward, by the second PSA UPF network element, the downlink packet having the source address translated into the first AS network address to the UP CL UPF network element, and a third downlink packet forwarding unit, which may be configured to forward, by the UP CL UPF network element, the downlink packet having the source address translated into the first AS network address to the target UE.

In an exemplary embodiment, the second source address translation unit may include a second source port number translation unit, which may be configured to translate, in a case that the second PSA UPF network element detects that the downlink packet has a source address being the second AS network address, a target address being the target UE network address, and a source port number being a second port number of the second AS, the source address of the downlink packet into the first AS network address and the source port number into a first port number of a first AS corresponding to the first AS network address according to the NAT rule.

In an exemplary embodiment, the UPF network element may include an UP CL UPF network element.

In an exemplary embodiment, the UPF network element 1800 may further include a unit session establishing unit, which may be configured to establish a target PDU session with a target UE corresponding to the target UE network address before the target N4 session request message is received, to cause the target UE to communicate with a first AS corresponding to the first AS network address.

For specific implementation of the units of the UPF network element provided in this embodiment of the present disclosure, reference may be made to the content of the foregoing method for implementing service continuity, and details are not described herein again.

Figure 19:
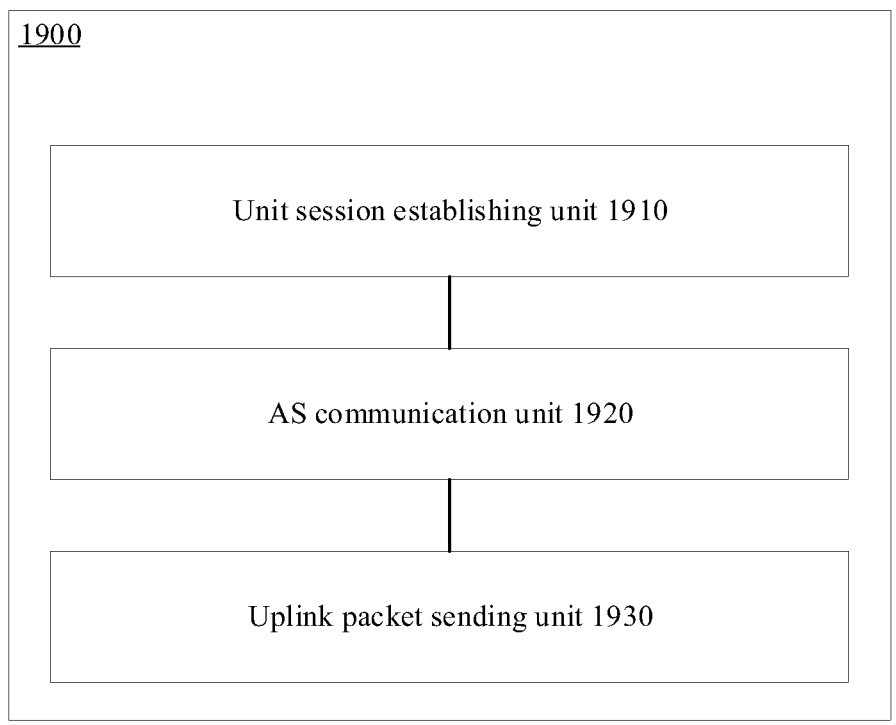
FIG. 19 is a diagram of a UE according to an embodiment.

FIG. 19 is a diagram of a UE according to an embodiment. As shown in FIG. 19, the UE 1900 provided in this embodiment of the present disclosure may include: a unit session establishing unit 1910, an AS communication unit 1920, and an uplink packet transmitting unit 1930.

The unit session establishing unit 1910 may be configured to establish a target PDU session to a first PSA UPF network element. The AS communication unit 1920 may be configured to communicate with a first AS corresponding to a first AS network address. The uplink packet transmitting unit 1930 may be configured to transmit an uplink packet to a target network device, the uplink packet having a source address being a target network device network address and a target address being the first AS network address, to cause the target network device to process the uplink packet according to a packet processing rule, to translate the target address of the uplink packet into a second AS network address and forward the uplink packet having the target address translated into the second AS network address to a second AS corresponding to the second AS network address.

In an exemplary embodiment, the UE 1900 may further include a downlink packet forwarding unit, which may be configured to receive a downlink packet from the target network device, where the downlink packet has a source address translated by the target network device from the second AS network address into the first AS network address according to the packet processing rule, and the downlink packet has a target address being the target UE network address.

For specific implementation of the units of the UE provided in this embodiment of the present disclosure, reference may be made to the content of the foregoing method for implementing service continuity, and details are not described herein again.

In technical solutions provided in some embodiments of the present disclosure, in an aspect, use of an NAT technology can keep service continuity when an AS is migrated or when a UE has a location changed, which is simple in implementation and easy in deployment; and in another aspect, based on a related technical solution, an innovative technical solution is added, so that the system is not modified greatly, and it is easy to perform standardized and large-scale deployment.

Although a plurality of units of a device configured to perform actions are discussed in the foregoing detailed description, such division is not mandatory. In fact, according to the implementations of the present disclosure, the features and functions of two or more units described above may be embodied in one unit. On the contrary, the features or functions of one unit described above may further be divided and specified by a plurality of units.

According to the foregoing descriptions of the implementations, a person skilled in the art may readily understand that the exemplary implementations described herein may be implemented by using software, or may be implemented by combining software and necessary hardware. Therefore, the technical solutions of the implementations of the present disclosure may be implemented in the form of a software product. The software product may be stored in a non-volatile storage medium (which may be a CD-ROM, a USB flash drive, a removable hard disk, or the like) or on the network including several instructions for instructing a computer device (which may be a personal computer, a server, a mobile terminal, a network device, or the like) to execute the methods described in the implementations of the present disclosure.

After considering the specification and practicing the present disclosure, a person skilled in the art may easily conceive of other implementations of the present disclosure. This application is intended to cover any variation, use, or adaptive change of the present disclosure. These variations, uses, or adaptive changes follow the general principles of the present disclosure and include common general knowledge or common technical means, which are not disclosed in the present disclosure, in the technology. The specification and the embodiments are considered as merely exemplary, and the real scope and spirit of the present disclosure are pointed out in the following claims.

At least one of the components, elements, modules or units (collectively "components" in this paragraph) represented by a block in the drawings may be embodied as various numbers of hardware, software and/or firmware structures that execute respective functions described above, according to an example embodiment. According to example embodiments, at least one of these components may use a direct circuit structure, such as a memory, a processor, a logic circuit, a look-up table, etc. that may execute the respective functions through controls of one or more microprocessors or other control apparatuses. Also, at least one of these components may be specifically embodied by a module, a program, or a part of code, which contains one or more executable instructions for performing specified logic functions, and executed by one or more microprocessors or other control apparatuses. Further, at least one of these components may include or may be implemented by a processor such as a central processing unit (CPU) that performs the respective functions, a microprocessor, or the like. Two or more of these components may be combined into one single component which performs all operations or functions of the combined two or more components. Also, at least part of functions of at least one of these components may be performed by another of these components. Functional aspects of the above exemplary embodiments may be implemented in algorithms that execute on one or more processors. Furthermore, the components represented by a block or processing steps may employ any number of related art techniques for electronics configuration, signal processing and/or control, data processing and the like.

The foregoing descriptions are merely example embodiments of this disclosure and are not intended to limit the protection scope of this disclosure. Any modification, equivalent replacement, or improvement made without departing from the spirit and range of this disclosure shall fall within the protection scope of this disclosure.

It is to be understood that the present disclosure is not limited to the precise structures described above and shown in the accompanying drawings, and various modifications and changes may be made without departing from the scope of the present disclosure. The scope of the present disclosure is limited only by the appended claims.

What is claimed is:

1. A method for implementing service continuity, performed by a session management (SM) function (SMF) network element, the method comprising:
   receiving a target relocation message, the target relocation message carrying target traffic routing information, the target traffic routing information comprising a target data network (DN) access identifier (DNAI) and network address translation (NAT) information, the NAT information comprising a target user equipment (UE) network address, a first application server (AS) network address, and a second AS network address, wherein a target UE corresponding to the target UE network address has established a target protocol data unit (PDU) session to a first PDU session anchor (PSA) user plane function (UPF) network element and is configured to communicate with a first AS corresponding to the first AS network address;
   generating a packet processing rule based on the target traffic routing information, the packet processing rule comprising an NAT rule, the NAT rule comprising:
      translating a target address of an uplink packet transmitted by the target UE from the first AS network address into the second AS network address, and
      translating a source address of a received downlink packet whose target address is the target UE network address from the second AS network address into the first AS network address; and
   delivering the packet processing rule to a target network device, to cause the target network device to forward, based on the packet processing rule, the uplink packet transmitted by the target UE to a second AS corresponding to the second AS network address and the received downlink packet whose target address is the target UE network address and whose source address is the second AS network address to the target UE.

2. The method of claim 1, wherein the target relocation message comprises an SM policy control update notification message,
   wherein the receiving the target relocation message comprises receiving the SM policy control update notification message from a target policy control function (PCF) network element, and
   wherein the SM policy control update notification message comprises a source DNAI corresponding to the first PSA UPF network element, the target DNAI, and the target traffic routing information.

3. The method of claim 2, wherein the SM policy control update notification message is generated by the target PCF network element based on a policy authorization request message received from a target network exposure function (NEF) network element,
   wherein the policy authorization request message comprises the target UE network address, the source DNAI, the target DNAI, and the target traffic routing information,
   wherein the policy authorization request message is generated by the target NEF network element according to an influence on traffic routing request message received from an application function (AF) network element, and wherein the influence on traffic routing request message comprises the target UE network address, the source DNAI, the target DNAI, and the target traffic routing information.

4. The method of claim 2, wherein the SM policy control update notification message is generated by the target PCF network element based on an influence on traffic routing request message received from an application function (AF) network element, and
wherein the influence on traffic routing request message comprises the target UE network address, the source DNAI, the target DNAI, and the target traffic routing information.

5. The method of claim 2, wherein, based on the target DNAI matching the source DNAI, the target network device comprises the first PSA UPF network element,
wherein the delivering the packet processing rule to the target network device comprises transmitting an N4 session modification request message to the first PSA UPF network element, and
wherein the N4 session modification request message comprises the packet processing rule.

6. The method of claim 5, further comprising:
receiving an N4 session modification response message with which the first PSA UPF network element replies; and
returning an SM policy control update notification response message to the target PCF network element, to cause the target PCF network element to return an influence on traffic routing response message to an application function (AF) network element,
wherein, based on receiving the influence on traffic routing response message, the AF network element triggers to complete migration of the first AS to the second AS.

7. The method of claim 1, wherein before the target relocation message is received, the first AS is migrated to the second AS through an application function (AF) network element.

8. The method of claim 1, wherein, based on the target traffic routing information further comprising a first port number of the first AS and a second port number of the second AS, the NAT rule further comprises translating a target port number of the uplink packet from the first port number into the second port number and translating a source port number of a downlink packet from the second port number into the first port number.

9. The method of claim 1, wherein, based on the target DNAI not matching a source DNAI supported by the first PSA UPF network element, the target network device comprises a second PSA UPF network element and an uplink classifier (UP CL) UPF network element, the packet processing rule further comprises a packet forwarding rule, and the packet forwarding rule comprises forwarding the uplink packet whose source address is the target UE network address and whose target address is the first AS network address to the second PSA UPF network element,
wherein the delivering the packet processing rule to the target network device comprises:
delivering the packet forwarding rule to the UP CL UPF network element; and
delivering the NAT rule to the second PSA UPF network element.

10. The method of claim 9, wherein, prior to delivering the packet processing rule to the target network device, the method further comprises:
determining the second PSA UPF network element;
determining the UP CL UPF network element;
updating a downlink user plane of the first PSA UPF network element; and
updating a downlink user plane of the second PSA UPF network element.

11. The method of claim 1, wherein, based on the target DNAI not matching a source DNAI supported by the first PSA UPF network element, the target network device comprises an uplink classifier (UP CL) UPF network element, and
wherein the delivering the packet processing rule to the target network device comprises delivering the packet processing rule to the UP CL UPF network element.

12. The method of claim 1, wherein the target relocation message comprises an event exposure application relocation information message,
wherein the receiving the target relocation message comprises receiving the event exposure application relocation information message from an application function (AF) network element, and
wherein the event exposure application relocation information message comprises the target traffic routing information.

13. The method of claim 12, wherein, prior to the target relocation message being received, the method further comprises:
receiving an early event subscription message of the AF network element;
deciding to perform PSA UPF network element modification; and
transmitting an early event notification message to the AF network element based on the deciding,
wherein the early event notification message comprises an event notification parameter, and
wherein the event notification parameter comprises a source DNAI corresponding to the first PSA UPF network element and the target DNAI corresponding to a second PSA UPF network element.

14. The method of claim 13, further comprising:
triggering, by the AF network element based on the early event notification message, migration of the first AS from the source DNAI to the target DNAI, to serve as the second AS.

15. The method of claim 13, wherein the packet processing rule further comprises a packet forwarding rule,
wherein after the target relocation message is received, the method further comprises:
determining the second PSA UPF network element and an uplink classifier (UP CL) UPF network element; and
using the second PSA UPF network element and the UP CL UPF network element as the target network device, and
wherein the delivering the packet processing rule to the target network device comprises:
delivering the packet forwarding rule to the UP CL UPF network element; and
delivering the NAT rule to the second PSA UPF network element.

16. The method of claim 13, wherein, after the target relocation message is received, the method further comprises:
determining the second PSA UPF network element and an uplink classifier (UP CL) UPF network element; and
using the UP CL UPF network element as the target network device, and wherein the delivering the packet processing rule to the target network device comprises delivering the packet processing rule to the UP CL UPF network element.

17. The method of claim 12, wherein, prior to the target relocation message being received, the method further comprises:
receiving a late event subscription message of the AF network element;
deciding to perform PSA UPF network element modification;
determining a second PSA UPF network element and an uplink classifier (UP CL) UPF network element based on the deciding;
configuring the UP CL UPF network element to forward the uplink packet to the first PSA UPF network element; and
transmitting a late event notification message to the AF network element,
wherein the late event notification message comprises an event notification parameter, and
wherein the event notification parameter comprises a source DNAI corresponding to the first PSA UPF network element and the target DNAI corresponding to the second PSA UPF network element.

18. The method of claim 17, further comprising:
triggering, by the AF network element based on the late event notification message, migration of the first AS from the source DNAI to the target DNAI, to serve as the second AS.

19. An apparatus, comprising:
at least one memory configured to store computer program code; and
at least one processor configured to access said computer program code and operate as instructed by said computer program code, said computer program code comprising:
first receiving code configured to cause the at least one processor to receive a target relocation message, the target relocation message carrying target traffic routing information, the target traffic routing information comprising a target data network (DN) access identifier (DNAI) and network address translation (NAT) information, the NAT information comprising a target user equipment (UE) network address, a first application server (AS) network address, and a second AS network address, wherein a target UE corresponding to the target UE network address has established a target protocol data unit (PDU) session to a first PDU session anchor (PSA) user plane function (UPF) network element and is configured to communicate with a first AS corresponding to the first AS network address;
first generating code configured to cause the at least one processor to generate a packet processing rule based on the target traffic routing information, the packet processing rule comprising an NAT rule, the NAT rule comprising:
translating a target address of an uplink packet transmitted by the target UE from the first AS network address into the second AS network address, and
translating a source address of a received downlink packet whose target address is the target UE network address from the second AS network address into the first AS network address; and
first delivering code configured to cause the at least one processor to deliver the packet processing rule to a target network device, to cause the target network device to forward, based on the packet processing rule, the uplink packet transmitted by the target UE to a second AS corresponding to the second AS network address and the received downlink packet whose target address is the target UE network address and whose source address is the second AS network address to the target UE.

20. A non-transitory computer-readable storage medium storing computer instructions that, when executed by at least one processor, cause the at least one processor to:
receive a target relocation message, the target relocation message carrying target traffic routing information, the target traffic routing information comprising a target data network (DN) access identifier (DNAI) and network address translation (NAT) information, the NAT information comprising a target user equipment (UE) network address, a first application server (AS) network address, and a second AS network address, wherein a target UE corresponding to the target UE network address has established a target protocol data unit (PDU) session to a first PDU session anchor (PSA) user plane function (UPF) network element and is configured to communicate with a first AS corresponding to the first AS network address;
generate a packet processing rule based on the target traffic routing information, the packet processing rule comprising an NAT rule, the NAT rule comprising:
translating a target address of an uplink packet transmitted by the target UE from the first AS network address into the second AS network address, and
translating a source address of a received downlink packet whose target address is the target UE network address from the second AS network address into the first AS network address; and
deliver the packet processing rule to a target network device, to cause the target network device to forward, based on the packet processing rule, the uplink packet transmitted by the target UE to a second AS corresponding to the second AS network address and the received downlink packet whose target address is the target UE network address and whose source address is the second AS network address to the target UE.

* * * * *